United States Patent [19]

Records et al.

[11] Patent Number: 5,522,026
[45] Date of Patent: May 28, 1996

[54] SYSTEM FOR CREATING A SINGLE ELECTRONIC CHECKLIST IN RESPONSE TO MULTIPLE FAULTS

[75] Inventors: Roger M. Records, Kent; John A. Taylor, Mercer Island; William D. Shontz, Renton; William A. McKenzie, Federal Way, all of Wash.

[73] Assignee: The Boeing Company, Seattle, Wash.

[21] Appl. No.: 210,689

[22] Filed: Mar. 18, 1994

[51] Int. Cl.[6] ........................................ G06F 3/14
[52] U.S. Cl. ........................... 395/161; 395/156; 395/157; 340/945
[58] Field of Search ................... 395/155, 157, 395/161, 600, 700; 340/945; 345/7; 364/492

[56] References Cited

U.S. PATENT DOCUMENTS

| | | | |
|---|---|---|---|
| 3,713,090 | 1/1973 | Dickinson | 340/27 R |
| 3,842,249 | 10/1974 | Geyer et al. | 364/492 |
| 4,635,030 | 1/1987 | Rauch | 340/945 |
| 4,847,603 | 7/1989 | Blanchard | 345/7 |
| 4,869,531 | 9/1989 | Rees | 283/67 |
| 4,962,473 | 10/1990 | Crain | 364/900 |
| 4,970,683 | 11/1990 | Harshaw et al. | 364/900 |
| 5,019,980 | 5/1991 | Starr et al. | 364/424.04 |
| 5,122,972 | 6/1992 | Richards et al. | 395/157 |
| 5,267,147 | 11/1993 | Harshaw et al. | 364/401 |

FOREIGN PATENT DOCUMENTS

| | | |
|---|---|---|
| 0377736 | 7/1990 | European Pat. Off. . |
| 83/01813 | 5/1985 | WIPO . |

*Primary Examiner*—Raymond J. Bayerl
*Assistant Examiner*—Ruay Lian Ho
*Attorney, Agent, or Firm*—Christensen, O'Connor, Johnson & Kindness

[57] ABSTRACT

A computer-based electronic checklist system automatically generates a single electronic checklist upon the detection of two or more control system faults. The checklist contains a plurality of notes to be read by, and action items to be performed by, the operator. The system combines a set of predefined action items for each fault and executes a set of conditional rules that modify the action items to reflect the current state of the control system. The system then executes a set of priority rules to determine the correct order in which the action items of the checklist are to be performed. Once the correct order of the action items is determined, the system executes a set of conflict rules to remove any conflicting or redundant action items in order to provide the operator with a single electronic checklist that is customized to the control system's current operating condition.

12 Claims, 12 Drawing Sheets

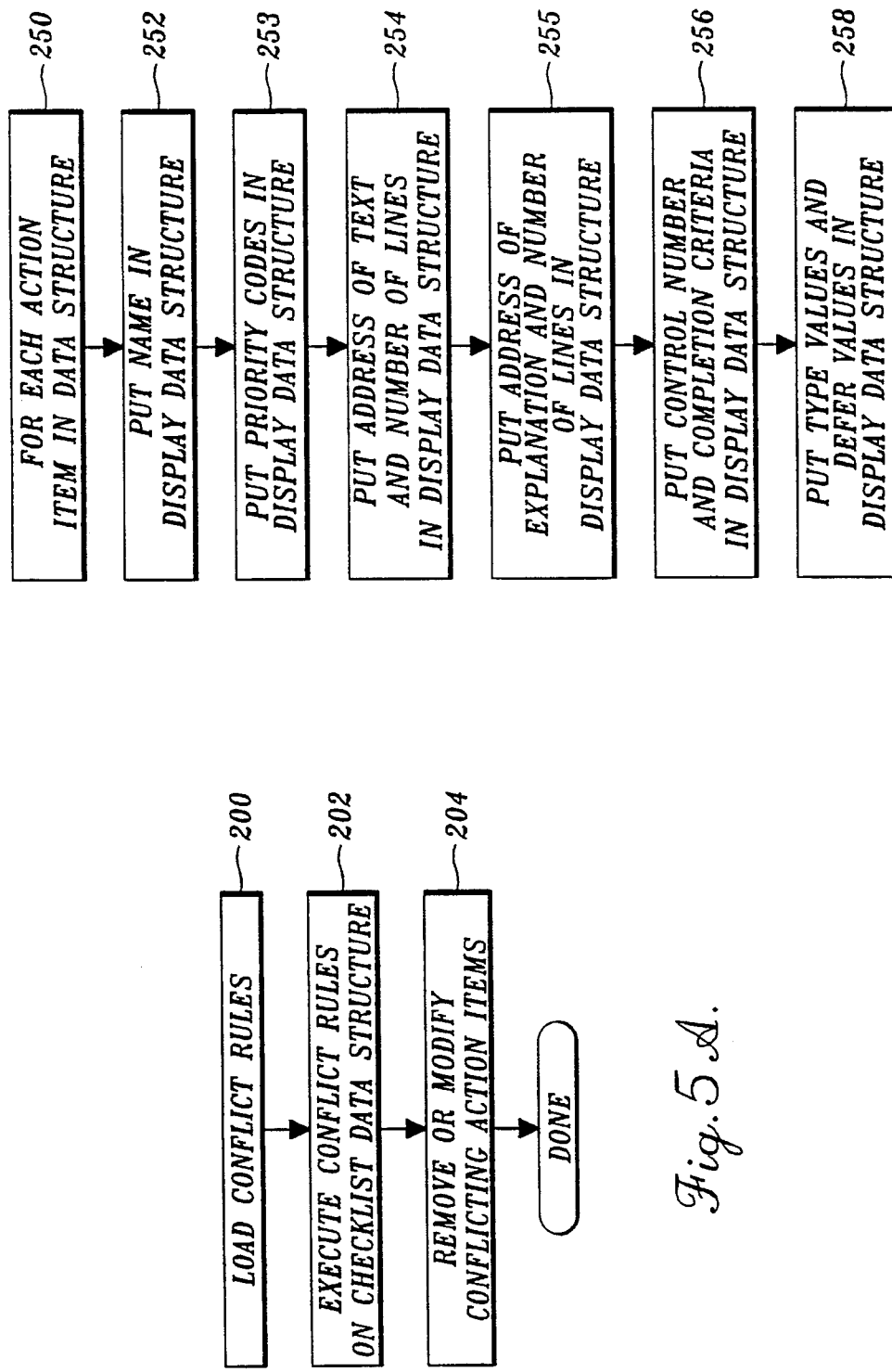

Fig. 7.

| NAME | SQ | PRI | UG | TEXT | L | EXPL | LE | CON | STATE | SUB | SP | TP | DEFER |
|---|---|---|---|---|---|---|---|---|---|---|---|---|---|
| BLANK-TITLE | 10 | AAB | 0 | 1 | 1 | 1 | 1 | 1999 | 88 | 0 | 0 | 6 | DEFER-TO |
| ENG2-OIL-F01 | 10 | D-A | 27 | 35 | 1 | 13 | 3 | 3021 | 64 | 0 | 0 | 3 | DEFER-TO |
| ENG2-OIL-F02 | 20 | D-A | 27 | 36 | 2 | 23 | 4 | 1999 | 88 | 0 | 0 | 7 | DEFER-TO |
| ENG2-OIL-F03 | 30 | D-A | 27 | 38 | 2 | 16 | 5 | 1429 | 88 | 0 | 0 | 8 | DEFER-TO |
| ENG2-OIL-F04 | 40 | D-A | 27 | 40 | 1 | 27 | 1 | 1999 | 32 | 0 | 0 | 6 | DEFER-TO |
| LBL-DCT-LK-TL | 10 | AAA | 0 | 53 | 1 | 31 | 4 | 1999 | 88 | 0 | 0 | 6 | DEFER-TO |
| BLANK-TITLE | 10 | AAB | 60 | 1 | 1 | 42 | 7 | 1417 | 88 | 0 | 0 | 0 | DEFER-TO |
| LBL-DCT-LK-01 | 20 | E-F | 60 | 54 | 1 | 56 | 3 | 3000 | 99 | 43 | 0 | 7 | DEFER-TO |
| LBL-DCT-LK-02 | 22 | E-F | 60 | 55 | 1 | 2 | 2 | 1999 | 99 | 0 | 0 | 0 | DEFER-TO |
| LBL-DCT-LK-2A | 30 | E-F | 60 | 56 | 1 | 49 | 3 | 1468 | 99 | 0 | 0 | 7 | DEFER-TO |
| LBL-DCT-LK-03 | 40 | E-F | 60 | 57 | 1 | 35 | 5 | 1406 | 88 | 0 | 0 | 0 | DEFER-TO |
| LBL-DCT-LK-04 | 42 | E-F | 60 | 58 | 1 | 70 | 3 | 1999 | 88 | 0 | 0 | 7 | DEFER-TO |
| LBL-DCT-LK-4A | 50 | G-W | 60 | 59 | 1 | 73 | 4 | 1999 | 99 | 0 | 0 | 0 | DEFER-TO |
| LBL-DCT-LK-05 | 60 | G-W | 60 | 60 | 1 | 77 | 2 | 3015 | 88 | 0 | 0 | 8 | DEFER-TO |
| LBL-DCT-LK-06 | 70 | G-W | 60 | 61 | 4 | 84 | 4 | 1999 | 88 | 0 | 0 | 3 | DEFER-TO |
| LBL-DCT-LK-07 | 10 | AAA | 0 | 175 | 1 | 59 | 4 | 1002 | 87 | 0 | 0 | 7 | DEFER-TO |
| ENGINE-FIRE-TITLE | 11 | AAB | 0 | 41 | 1 | 28 | 3 | 1999 | 37 | 0 | 0 | 8 | DEFER-TO |
| BLANK-TITLE | 20 | D-A | 50 | 42 | 1 | 1 | 1 | 1413 | 32 | 0 | 0 | 3 | DEFER-TO |
| ENGINE-FIRE-01 | 30 | D-A | 50 | 43 | 1 | 40 | 2 | 1431 | 42 | 0 | 0 | 7 | DEFER-TO |
| ENGINE-FIRE-03 | 40 | D-A | 50 | 44 | 1 | 79 | 5 | 1437 | 88 | 0 | 0 | 6 | DEFER-TO |
| ENGINE-FIRE-04 | 50 | D-A | 50 | 45 | 1 | 63 | 2 | 1999 | 43 | 0 | 0 | 1 | LAND-PRP |
| ENGINE-FIRE-05 | 52 | D-A | 50 | 46 | 1 | 65 | 3 | 3012 | 88 | 0 | 0 | 0 | DEFER-TO |
| ENGINE-FIRE-5A | 54 | D-A | 50 | 47 | 1 | 68 | 5 | 1999 | 44 | 0 | 0 | 0 | DEFER-TO |
| ENGINE-FIRE-5B | 60 | D-A | 50 | 48 | 1 | 96 | 4 | 3013 | 88 | 0 | 0 | 0 | DEFER-TO |
| ENGINE-FIRE-06 | 62 | D-A | 50 | 50 | 1 | 52 | 2 | 1999 | 0 | 0 | 0 | 0 | DEFER-TO |
| ENGINE-FIRE-6A | 64 | D-A | 50 | 52 | 1 | 101 | 4 | 1021 | 88 | 0 | 0 | 0 | DEFER-TO |
| ENGINE-FIRE-6B | 10 | AAA | 0 | 229 | 2 | 103 | 7 | 1999 | 1 | 0 | 0 | 0 | DEFER-TO |
| CAB-ALT-TITLE | 20 | AAB | 0 | 230 | 1 | 107 | 1 | 1999 | 37 | 0 | 0 | 0 | DEFER-TO |
| BLANK-TITLE | 30 | B-P-L | 10 | 231 | 1 | 119 | 2 | 1297 | 52 | 0 | 0 | 0 | DEFER-TO |
| CAB-ALT-RD-01 | 40 | C-P-L | 10 | 232 | 2 | 121 | 3 | 1431 | 88 | 0 | 0 | 0 | DEFER-TO |
| CAB-ALT-RD-02 | 50 | C-P-L | 10 | 233 | 1 | 124 | 2 | 1999 | 88 | 0 | 0 | 0 | DEFER-TO |
| CAB-ALT-RD-03 | 60 | C-P-L | 10 | 234 | 1 | 94 | 2 | 1410 | 88 | 0 | 0 | 0 | DEFER-TO |
| CAB-ALT-RD-04 | 70 | C-P-L | 10 | 235 | 1 | 114 | 5 | 1350 | 88 | 0 | 0 | 0 | DEFER-TO |
| CAB-ALT-RD-05 | 80 | C-P-L | 10 | 236 | 2 | 126 | 4 | 1999 | 88 | 0 | 0 | 0 | DEFER-TO |
| CAB-ALT-RD-06 | 90 | C-P-L | 10 | 237 | 3 | 88 | 6 | 1028 | 88 | 0 | 0 | 2 | LAND-PRP |

| NAME | SQ | PRI | UG | TEXT | L | EXPL | LE | CON | STATE | SUB | SP | TP | DEFER |
|---|---|---|---|---|---|---|---|---|---|---|---|---|---|
| ENG-FIRE-TITLE | 10 | AAA | 0 | 41 | 1 | 28 | 3 | 1002 | 88 | 0 | 0 | 6 | DEFER-TO |
| BLANK-TITLE | 11 | AAB | 0 | 1 | 1 | 1 | 1 | 1999 | 88 | 0 | 0 | 6 | DEFER-TO |
| ENGINE-FIRE-01 | 20 | D-A | 50 | 42 | 1 | 40 | 2 | 1413 | 37 | 0 | 0 | 0 | DEFER-TO |
| ENGINE-FIRE-03 | 30 | D-A | 50 | 43 | 1 | 79 | 5 | 1431 | 32 | 0 | 0 | 0 | DEFER-TO |
| ENGINE-FIRE-04 | 40 | D-A | 50 | 44 | 1 | 63 | 2 | 1437 | 42 | 0 | 0 | 0 | DEFER-TO |
| ENGINE-FIRE-05 | 50 | D-A | 50 | 45 | 1 | 65 | 3 | 1999 | 88 | 0 | 0 | 8 | DEFER-TO |
| ENGINE-FIRE-5A | 52 | D-A | 50 | 46 | 1 | 68 | 2 | 3012 | 43 | 0 | 0 | 3 | DEFER-TO |
| ENGINE-FIRE-5B | 54 | D-A | 50 | 47 | 1 | 96 | 5 | 1999 | 88 | 0 | 0 | 7 | DEFER-TO |
| ENGINE-FIRE-06 | 60 | D-A | 50 | 48 | 1 | 52 | 4 | 1999 | 88 | 0 | 0 | 8 | DEFER-TO |
| ENGINE-FIRE-6A | 62 | D-A | 50 | 50 | 2 | 101 | 2 | 3013 | 44 | 0 | 0 | 3 | DEFER-TO |
| ENGINE-FIRE-6B | 64 | D-A | 50 | 52 | 2 | 103 | 4 | 1999 | 88 | 0 | 0 | 7 | LAND-PRP |
| CAB-ALT-TITLE | 10 | AAA | 0 | 229 | 1 | 107 | 7 | 1021 | 88 | 0 | 0 | 6 | DEFER-TO |
| BLANK-TITLE | 20 | AAB | 0 | 230 | 1 | 1 | 1 | 1999 | 0 | 0 | 0 | 1 | DEFER-TO |
| CAB-ALT-RD-01 | 30 | B-P-L | 10 | 231 | 1 | 119 | 2 | 1999 | 88 | 0 | 0 | 0 | DEFER-TO |
| CAB-ALT-RD-02 | 40 | C-P-L | 10 | 232 | 2 | 121 | 3 | 1297 | 1 | 0 | 0 | 0 | DEFER-TO |
| CAB-ALT-RD-03 | 50 | C-P-L | 10 | 234 | 1 | 124 | 2 | 1410 | 37 | 0 | 0 | 0 | DEFER-TO |
| CAB-ALT-RD-04 | 60 | C-P-L | 10 | 235 | 1 | 94 | 2 | 1350 | 52 | 0 | 0 | 0 | DEFER-TO |
| CAB-ALT-RD-05 | 70 | C-P-L | 10 | 236 | 1 | 114 | 5 | 1999 | 88 | 0 | 0 | 0 | DEFER-TO |
| CAB-ALT-RD-06 | 80 | C-P-L | 10 | 237 | 2 | 126 | 4 | 1999 | 88 | 0 | 0 | 0 | DEFER-TO |
| CAB-ALT-RD-07 | 90 | C-P-L | 10 | 239 | 3 | 88 | 6 | 1028 | 88 | 0 | 0 | 2 | LAND-PRP |

Fig. 8.

| NAME | SQ | PRI | UG | TEXT | L | EXPL | LE | CON | STATE | SUB | SP | TP | DEFER |
|---|---|---|---|---|---|---|---|---|---|---|---|---|---|
| CAB-ALT-TITLE | 10 | AAA | 0 | 229 | 1 | 107 | 7 | 1021 | 88 | 0 | 0 | 6 | DEFER-TO |
| ENG-FIRE-TITLE | 10 | AAA | 0 | 41 | 1 | 28 | 3 | 1002 | 88 | 0 | 0 | 6 | DEFER-TO |
| BLANK-TITLE | 11 | AAB | 0 | 1 | 1 | 1 | 1 | 1999 | 88 | 0 | 0 | 6 | DEFER-TO |
| CAB-ALT-RD-01 | 30 | B-P-L | 10 | 231 | 1 | 119 | 2 | 1999 | 88 | 0 | 0 | 0 | DEFER-TO |
| CAB-ALT-RD-02 | 40 | C-P-L | 10 | 232 | 2 | 121 | 3 | 1297 | 1 | 0 | 0 | 0 | DEFER-TO |
| CAB-ALT-RD-03 | 50 | C-P-L | 10 | 234 | 1 | 124 | 2 | 1410 | 37 | 0 | 0 | 0 | DEFER-TO |
| CAB-ALT-RD-04 | 60 | C-P-L | 10 | 235 | 1 | 94 | 2 | 1350 | 52 | 0 | 0 | 0 | DEFER-TO |
| CAB-ALT-RD-05 | 70 | C-P-L | 10 | 236 | 1 | 114 | 5 | 1999 | 88 | 0 | 0 | 0 | DEFER-TO |
| CAB-ALT-RD-06 | 80 | C-P-L | 10 | 237 | 2 | 126 | 4 | 1999 | 88 | 0 | 0 | 0 | DEFER-TO |
| CAB-ALT-RD-07 | 90 | C-P-L | 10 | 239 | 3 | 88 | 6 | 1028 | 88 | 0 | 0 | 2 | LAND-PRP |
| ENGINE-FIRE-01 | 20 | D-A | 50 | 42 | 1 | 40 | 2 | 1413 | 37 | 0 | 0 | 0 | DEFER-TO |
| ENGINE-FIRE-03 | 30 | D-A | 50 | 43 | 1 | 79 | 5 | 1431 | 32 | 0 | 0 | 0 | DEFER-TO |
| ENGINE-FIRE-04 | 40 | D-A | 50 | 44 | 1 | 63 | 2 | 1437 | 42 | 0 | 0 | 8 | DEFER-TO |
| ENGINE-FIRE-05 | 50 | D-A | 50 | 45 | 1 | 64 | 3 | 1999 | 88 | 0 | 0 | 8 | DEFER-TO |
| ENGINE-FIRE-5A | 52 | D-A | 50 | 46 | 1 | 68 | 2 | 3012 | 43 | 0 | 0 | 3 | DEFER-TO |
| ENGINE-FIRE-5B | 54 | D-A | 50 | 47 | 1 | 96 | 5 | 1999 | 88 | 0 | 0 | 7 | DEFER-TO |
| ENGINE-FIRE-06 | 60 | D-A | 50 | 48 | 2 | 52 | 4 | 1999 | 88 | 0 | 0 | 8 | DEFER-TO |
| ENGINE-FIRE-6A | 62 | D-A | 50 | 50 | 2 | 101 | 2 | 3013 | 44 | 0 | 0 | 3 | DEFER-TO |
| ENGINE-FIRE-6B | 64 | D-A | 50 | 52 | 1 | 103 | 4 | 1999 | 88 | 0 | 0 | 7 | LAND-PRP |

*Fig. 9.*

| NAME | SQ | PRI | UG | TEXT | L | EXPL | LE | CON | STATE | TP | DEFER |
|---|---|---|---|---|---|---|---|---|---|---|---|
| CAB-ALT-TITLE | 10 | AAA | 0 | 229 | 1 | 107 | 7 | 1021 | 88 | 6 | DEFER-TO |
| ENG-FIRE-TITLE | 10 | AAA | 0 | 41 | 1 | 28 | 3 | 1002 | 88 | 6 | DEFER-TO |
| BLANK-TITLE | 11 | AAB | 0 | 1 | 1 | 1 | 1 | 1999 | 88 | 6 | DEFER-TO |
| CAB-ALT-RD-01 | 30 | B-P-L | 10 | 231 | 1 | 110 | 2 | 1999 | 88 | 0 | DEFER-TO |
| CAB-ALT-RD-02 | 40 | C-P-L | 10 | 232 | 2 | 121 | 3 | 1297 | 1 | 0 | DEFER-TO |
| CAB-ALT-RD-03 | 50 | C-P-L | 10 | 234 | 1 | 124 | 2 | 1410 | 37 | 0 | DEFER-TO |
| CAB-ALT-RD-04 | 60 | C-P-L | 10 | 235 | 1 | 94 | 2 | 1350 | 52 | 0 | DEFER-TO |
| CAB-ALT-RD-05 | 70 | C-P-L | 10 | 236 | 1 | 114 | 5 | 1999 | 88 | 0 | DEFER-TO |
| CAB-ALT-RD-06 | 80 | C-P-L | 10 | 237 | 2 | 126 | 4 | 1999 | 88 | 2 | LAND-PRP |
| CAB-ALT-RD-07 | 90 | C-P-L | 10 | 239 | 3 | 88 | 5 | 1028 | 88 | 0 | DEFER-TO |
| ENGINE-FIRE-01 | 20 | D-A | 50 | 42 | 1 | 40 | 2 | 1413 | 37 | 0 | DEFER-TO |
| ENGINE-FIRE-03 | 30 | D-A | 50 | 43 | 1 | 79 | 4 | 1431 | 32 | 0 | DEFER-TO |
| ENGINE-FIRE-04 | 40 | D-A | 50 | 44 | 1 | 63 | 2 | 1437 | 42 | 0 | DEFER-TO |
| ENGINE-FIRE-05 | 50 | D-A | 50 | 45 | 1 | 65 | 3 | 1999 | 88 | 8 | DEFER-TO |
| ENGINE-FIRE-5A | 52 | D-A | 50 | 46 | 1 | 68 | 2 | 3012 | 43 | 3 | DEFER-TO |
| ENGINE-FIRE-5B | 54 | D-A | 50 | 47 | 1 | 96 | 5 | 1999 | 88 | 7 | DEFER-TO |
| ENGINE-FIRE-06 | 60 | D-A | 50 | 48 | 2 | 52 | 4 | 1999 | 88 | 8 | DEFER-TO |
| ENGINE-FIRE-6A | 62 | D-A | 50 | 50 | 2 | 101 | 2 | 3013 | 44 | 3 | DEFER-TO |
| ENGINE-FIRE-6B | 64 | D-A | 50 | 52 | 1 | 103 | 4 | 1999 | 88 | 7 | LAND-PRP |

*Fig. 10.*

SYSTEM FOR CREATING A SINGLE ELECTRONIC CHECKLIST IN RESPONSE TO MULTIPLE FAULTS

FIELD OF THE INVENTION

The present invention relates to control systems in general, and in particular to systems for producing electronic checklists that indicate to an operator a series of steps that are to be completed in the event one or more faults are detected in the system.

BACKGROUND OF THE INVENTION

A paramount design consideration for any airline manufacturer is the safety of passengers, the aircraft and crew. In order to further promote this goal, pilots and crew undergo rigorous training before being allowed to fly a given model of aircraft. This training involves practicing routine flight operations as well as rehearsing what to do in the case of numerous emergency situations.

To help pilots remember the steps to be performed for a given aircraft situation, most aircraft are supplied with a quick reference handbook. The handbook contains a plurality of paper checklists that list notes and steps, or "action items," to be performed for such normal flight phases as takeoff, landing, parking, etc., as well as checklists for emergency situations such as cabin decompression, engine fire, hydraulic system failure, etc.

Although such paper checklists have proved satisfactory in the past, they are subject to numerous drawbacks. First, the quick reference handbook may become misplaced in an aircraft cockpit and not be locatable by a crew during an emergency situation. Secondly, the index of a checklist manual may be such that a pilot is unable to quickly locate the appropriate checklist for a given situation. Thirdly, paper checklists are generic and not tailored to the particular configuration of the aircraft being flown. For example, the checklist might tell the pilot to do something to the "affected engine" instead of the "left engine" if there is a problem with the left engine, etc. Finally, the paper checklists provide no means for indicating which steps have already been performed so that a pilot may inadvertently perform the same step twice or omit a step.

To solve the problems associated with paper checklists, electronic checklist systems have been developed. The Boeing Company has developed such an electronic checklist system that is the subject of commonly assigned, co-pending U.S. patent application Ser. No. 07/762,309, filed Sep. 18, 1991 and entitled Electronic Checklist System (hereinafter '309 Application), the specification of which is herein incorporated by reference.

The electronic checklist system described in the '309 application provides an electronic display of the action items and notes listed on the paper checklists provided in the quick reference handbook. In addition, the system indicates the action items that have been completed by the pilot or crew by displaying them in green, while the uncompleted action items that have yet to be performed on a checklist are shown in white. Once the pilot completes the action item or acknowledges the note, the color of the display changes to indicate the step has been completed. For action items that require a pilot to change the setting of a switch, lever, etc., that is monitored by the aircraft's sensing systems, the checklist system monitors the aircraft's data bus systems to verify that a pilot has completed a particular step. Such action items are referred to as closed-loop. The system also provides for open-loop action items, whereby a sensor cannot be interrogated to see if the action item is performed. To complete an open-loop action item, a pilot manually indicates that the action item has been completed by selecting a "done" key on a user interface. While such an electronic checklist system is an improvement over prior art paper checklist systems, the electronic checklist system described in the '309 application is not designed to provide a single, integrated checklist for multiple situations, such as multiple aircraft faults.

While it is extremely rare in aircraft operation that more than a single fault is detected at exactly the same time, this can occur. For example, a first fault may be detected, such as an engine fire, and shortly thereafter another fault, such as loss of hydraulic pressure, will be detected. For a flight crew that is equipped with a paper checklist system, assuming the faults occur sufficiently far apart in time, a dual fault situation would be dealt with by opening the quick reference handbook to the checklist that deals with engine fires and completing the action items in the order listed. Upon completion of the first checklist, the crew would then turn to the checklist associated with the second fault, i.e., the loss of hydraulic pressure and complete the action items listed. The problem with this approach is that often a crew may not be able to finish the first checklist before a second fault is detected. The crew then has to keep the quick reference handbook open to both checklists and reason what action items are to be performed and in what order. Given the number of faults that are possible in a complex machine such as an aircraft, it is not possible to provide a single paper checklist tailored to every possible combination of faults. Such a quick reference handbook would be too large to be carried by the crew and it would take too long for the crew to find the appropriate checklist.

As indicated above, the '309 electronic checklist system works well for displaying the action items and notes of a checklist produced for a single fault. However, it does not have the capability of combining two or more checklists in the case of multiple fault detection. The problem with combining checklists is that the order in which the action items are to be performed often depends upon the current flying condition of the aircraft, its phase of flight (i.e., takeoff, cruise or landing), altitude, air temperature, etc. Thus, in order to combine two checklists, the electronic checklist system must be able to determine the current flying condition of the aircraft and know how the flying condition affects the priority of the action items so that the action items on the checklist can be merged and prioritized in the correct order. In addition, any redundant or conflicting action items that occur because the action items for multiple faults were combined must be eliminated so as not to confuse the pilot.

SUMMARY OF THE INVENTION

The present invention is an electronic checklist system for producing electronic checklists in response to two or more faults that are detected by an aircraft sensing system. The electronic checklist system operates to produce a single, integrated checklist in response to two or more faults that are detected by an aircraft sensing system and transmitted on the data bus. The checklist is first analyzed to remove any action items that should not be performed by the pilot or crew because of current system conditions. The action items on the checklist are then properly ordered for the aircraft's current flying condition, and any conflicting action items are resolved in the checklist before it is displayed to the pilot.

The electronic checklist system is coupled to the aircraft data bus to sense any fault signals that are produced by the aircraft sensing system. Upon detecting a fault, the system determines one or more action items that are to be performed in response to the detected fault. The action items are placed in a list for eventual display to the pilot. Before the action items are displayed, the system loads a series of conditional rules that correspond to the particular fault detected. The conditional rules cause the electronic system to monitor the data bus and determine whether any action item should not be performed by the pilot. If the action item should not be performed, the action item is deleted from the list of action items.

If the electronic checklist system detects another fault on the data bus, the system operates to read a fault code and determine the action items that correspond to the newly detected fault code. The action items are then appended to the list of action items that were retrieved for the first detected fault. The system then executes a series of priority rules which cause the electronic checklist system to evaluate one or more operating characteristics of the aircraft (such as altitude, air temperature, speed, fuel remaining, etc.) and vary one or more priority codes associated with each of the action items, if necessary, depending upon the operating characteristics. Once the priority rules have been executed, the system sorts the action items according to the set of priority codes.

In addition, the present invention can modify a checklist for a fault that may have occurred earlier in flight. The checklist system stores an indication regarding whether an action item affects another checklist so that if the first action item is completed the affected checklist can be modified. Furthermore, the present invention allows a pilot to enter a dispatch deviation that indicates one or more non-critical items on the aircraft are inoperative. The checklist system then modifies any checklist that uses or references the inoperative item to reflect the proper steps to be taken by the pilot to compensate for the dispatch deviation.

DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A and 5B are two flow charts showing the steps taken by the present invention to remove conflicting items that may result due to the merging of action items associated with two or more faults;

FIG. 6 is a flow chart showing the steps taken by the present invention to create a display data structure used by the electronic checklist system in order to display the checklist to the pilot;

FIG. 7 is a partial view of a procedure database used by the present invention to store the action items that can be placed in a checklist;

FIG. 8 is an example of a unordered checklist data structure created by the present invention;

FIG. 9 is an example of an ordered checklist data structure that is customized for an aircraft's current flying condition; and FIG. 10 is an example of a checklist display data structure that is passed to the electronic checklist system and displayed to the pilot.

DETAILED DESCRIPTION OF THE PREFERRED EMBODIMENT

Figure 1:
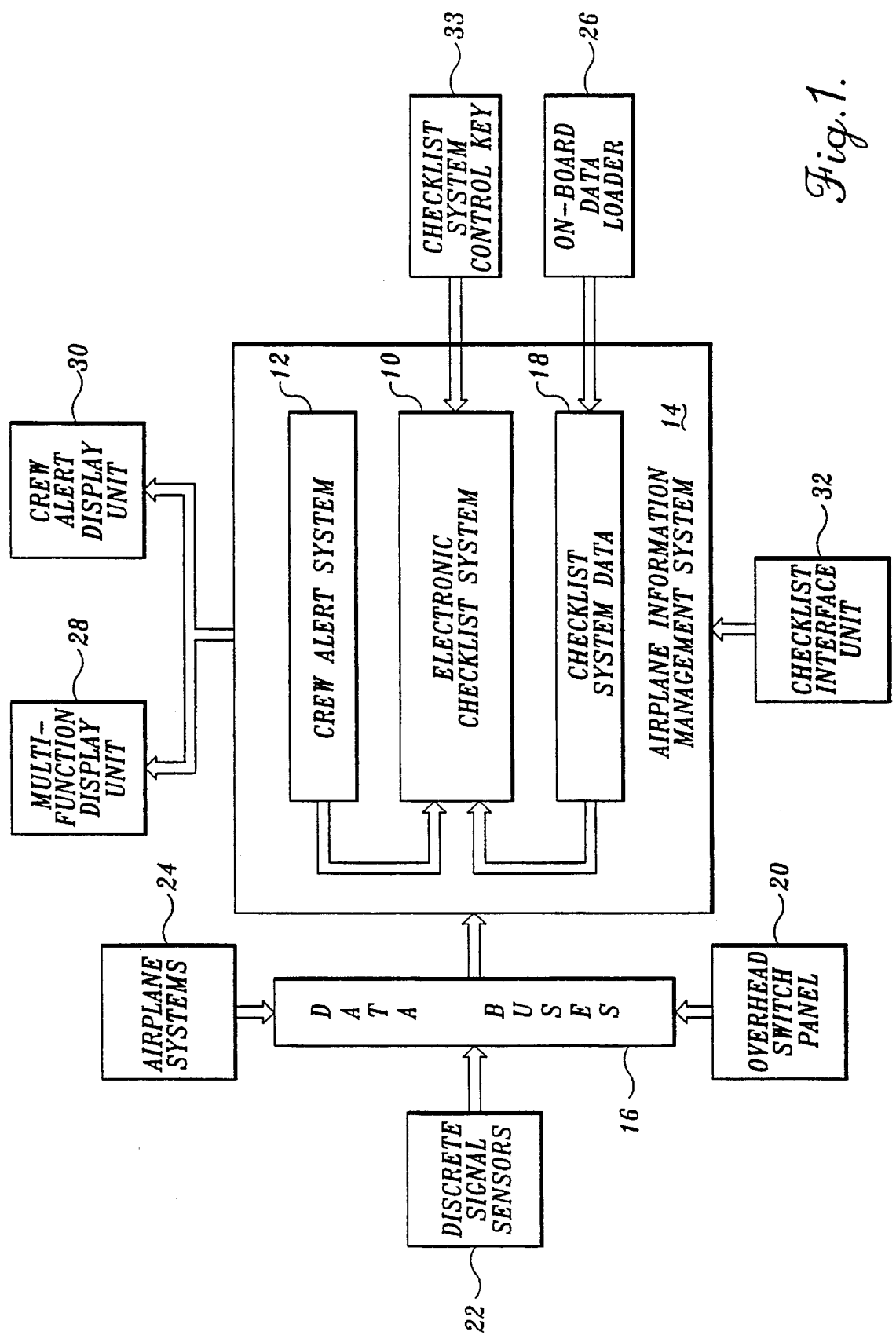
FIG. 1 is a block diagram depicting an electronic checklist system of the present invention operatively interconnected with an airplane crew alert system, display units and various other airplane systems and equipment that are used in the practice of the invention.

The present invention is directed to a method and apparatus for producing a single integrated electronic checklist when either a single or multiple faults are detected by an aircraft sensing system. As described above, flight crews are currently given a quick reference handbook that contains checklists for various procedures that are to be performed for a given model and make of aircraft. For example, the following is the checklist setting forth the action items to be taken by a pilot when an engine fire is detected in a Boeing B757 aircraft.

| ENGINE FIRE, SEVERE DAMAGE OR SEPARATION | |
|---|---|
| THRUST LEVER | CLOSE |
| Disengage autothrottle if on. | |
| FUEL CONTROL SWITCH | CUTOFF |
| ENGINE FIRE SWITCH | PULL |
| If engine fire warning light remains illuminated: | |
| ENGINE FIRE SWITCH | ROTATE |
| Rotate to the stop and hold for 1 second. | |
| After 30 seconds, if engine fire warning light remains illuminated: | |
| ENGINE FIRE SWITCH | ROTATE TO REMAINING BOTTLE |
| Rotate to the stop and hold for 1 second. | |
| APU (If Available) | START |
| GROUND PROXIMITY FLAP OVERRIDE SWITCH | OVRD |
| If wing anti-ice required: | |
| ONE PACK CONTROL SELECTOR | OFF |
| ISOLATION SWITCH | ON |
| Return to OFF when wing anti-ice is no longer required. | |
| LANDING PREPARATION | |
| Use flaps 20 and VREF 20 for landing and flaps 5 for go-around. | |

If a pilot flying an aircraft that is not equipped with an electronic checklist system detects an engine fire, the pilot would have to open the quick reference handbook to the engine fire checklist and begin performing the action items listed. The action items outlined in the box are called memory items that the pilot has been trained to perform prior to opening the handbook. However, if the pilot forgets to perform the items, they are listed.

As described above, a major problem with the paper checklist system and currently available electronic checklist systems occurs when a second fault is detected before the pilot and crew have been able to complete the checklist for the first fault. For example, the following is the checklist setting forth the action items to be completed in the event a rapid cabin depressurization occurs in a Boeing B757 aircraft.

| CABIN ALTITUDE RAPID DEPRESSURIZATION | |
| --- | --- |
| CABIN ALTITUDE AND RATE | CHECK |
| If cabin altitude cannot be controlled: | |
| PASSENGER OXYGEN | ON |
| THRUST LEVERS | CLOSE |
| SPEEDBRAKES | EXTEND |
| DESCEND at Vmo/Mmo | |
| LEVEL OFF at 10,000 ft. or Minimum Safe Altitude whichever higher | |
| If structural integrity is in doubt, limit airspeed and avoid high maneuvering loads. | |

If both an engine fire and rapid depressurization faults are detected, the pilot must open the quick reference handbook to both checklists and determine the order in which the action items listed are to be performed. Furthermore, it is possible that the preferred order of the action items may change depending on the current flying condition of the aircraft. For example, if an aircraft experiences both an engine fire and cabin depressurization, the order in which the action items of the checklists are to be performed depend upon whether the aircraft is above 10,000 feet. Above this altitude it is necessary that the pilot first supply himself, the crew, and passengers with oxygen and rapidly descend to an altitude of 10,000 feet or below so that sufficient levels of oxygen are available to sustain life. However, if the aircraft is not flying above 10,000 feet, then it is more important that the pilot attempt to put out the engine fire before dealing with the loss of cabin pressure.

Using the paper checklists, the pilot must rely on his own knowledge and experience to recognize the order in which to perform action items on two different checklists. However, it is possible that if a pilot is inexperienced or simply forgets, the pilot could perform the action items in the wrong order or perform a step that is incorrect for the particular flying condition of the aircraft. As will be described below, the present invention generates a single electronic checklist that is displayed to the pilot in the event when two or more faults are detected. The single electronic checklist combines the action items for each fault and customizes the order of the action items for the aircraft's particular flying condition.

Before describing how the present invention operates to produce a single electronic checklist, it is useful to describe how a standard, nonemergency electronic checklist is displayed for a pilot. The present invention works with the computer-based electronic checklist system described in the '309 application more fully referenced above. That electronic checklist system operates in conjunction with a crew alert system to provide interactive rapid retrieval and execution of checklists that are used during normal and non-normal operation of an airplane.

In the currently preferred embodiment of the present invention, the signal processing means of both the crew alert system and the electronic checklist system are realized as a single digital signal processing unit. In the currently preferred embodiment, which is shown in block diagram form in FIG. 1, an electronic checklist system (generally identified by reference numeral 10) and a crew alert system 12 are included in an airplane information management system 14.

The airplane information management system 14 includes one or more signal processing units and related memory (both random access memory and read only memory) that are structurally and functionally interconnected in a conventional manner. Stored in memory are programs for processing data that is supplied to airplane information management system 14 via the airplane data buses 16. Data used during operation of the airplane information management system 14 also are stored in system memory. For example, expressly indicated in FIG. 1 is the checklist system data 18.

In the type of airplane in which the electronic checklist system of this invention will initially be installed, data buses 16 include data buses that structurally and functionally meet the requirements of ARINC 629. Use of the ARINC 629 technology allows airplane information management system 14 to access signals representative of the state (e.g., opened, closed, on, off, etc.) of various airplane switches and valves such as the switches located on the flight deck overhead switch panel (20 in FIG. 1). These switches are of significance in the practice of the invention since some checklists call for verification that one or more switches located on overhead switch panel 20 have been placed in a particular state by the pilot or another member of the flight crew. As shall be described in more detail, in the currently preferred embodiment of the invention, electronic checklist system 10 monitors the state of various switches that are located on overhead switch panel 20. During execution of a checklist in which one or more action items require that a switch located on the switch panel 20 be in a certain state, electronic checklist system 10 automatically notes completion of that step as soon as the associated switch is placed in the proper state. That is, the pilot or other crew member executing the checklist need take no action if the switch that is to be observed or monitored already is in the proper state. If the switch is not in the proper state, electronic checklist system 10 notes (by color or graphical symbol) the completion of the checklist item as soon as the switch is activated by the pilot or crew member (no manual operation is required to confirm completion of the checklist item).

As is known to those skilled in the art, signals representative of the state or condition of devices such as switches and valves (commonly called "discretes") are often employed in airplane systems. Thus, by using discrete signal sensors (indicated by numeral 22 in FIG. 1), the invention can be embodied in airplanes that are not equipped with ARINC 629 data buses. Further, if necessary or desired, discrete signal sensors 22 can be employed in airplanes equipped with ARINC 629 data buses to thereby provide additional information to airplane information management system 14 (and hence provide additional information to the electronic checklist system 10).

As is also known to those skilled in the art, the airplane data buses 16 receive various signals from numerous airplane systems (indicated in FIG. 1 by reference numeral 24). For example, various airplane system signals that are supplied to the airplane data buses are monitored and processed by a crew alert system (e.g., crew alert system 12 of FIG. 1) in order to determine non-normal system conditions and report those conditions to the flight crew by means of visual or recorded messages.

With continued reference to FIG. 1, in the currently preferred embodiments of the invention, electronic checklist system 10 is interfaced with crew alert system 12 to receive signals representative of the status of each alert provided by the crew alert system (i.e., whether a particular alert is or is not in effect). In addition, electronic checklist system 10 is interfaced with crew alert system 12 so that electronic checklist system 10 can supply signals to crew alert system 12 indicative of checklist status (i.e., whether a checklist associated with a crew alert has been completed; has been accessed for execution, but has not been completed; or has not yet been accessed for execution). The interfacing and interrelationship is diagrammatically depicted in FIG. 1 and shall be described in more detail.

As also is diagrammatically indicated in FIG. 1, electronic checklist system 10 receives data signals from checklist system data 18. These data signals provide electronic checklist system 10 with information that includes system configuration information (e.g., checklist system version or revision dates and the identity of the airplane in which the system is installed); a checklist index file, which allows rapid retrieval and display of checklists; checklist text which provides the information items displayed by the electronic checklist system; and checklist attribute information. As will be described in more detail, the checklist attributes and checklist item attributes employed by the invention enable the electronic checklist system to achieve various system objectives. As previously noted, these objectives include merging of multiple checklists, accurate and rapid access to and execution of both normal and non-normal checklists, ease of use, a high degree of reliability (both with respect to system operation and ensuring complete execution of all applicable checklists), and the ability to easily maintain and modify the electronic checklist system to suit the needs of a particular airline or other airplane user.

FIG. 1 indicates one way of providing ease of checklist system maintenance and modification. In particular, the arrangement of FIG. 1 includes an on-board data loader 26, which is coupled to airplane information management system 14. As is indicated in FIG. 1, on-board data loader 26 supplies data to checklist system data 18 (i.e., memory locations within airplane information management system 14). The data supplied by on-board data loader 26 can modify the checklists that are established by electronic checklist system 10 so as to add checklist line items, delete checklist line items, and change or add notes and offer informational items. In addition, new checklists can be created and the hereinafter-described checklist attributes and/or checklist line item attributes can be modified.

As will be recognized by those skilled in the art, various devices can be used to realize on-board data loader 26. For example, on-board data loader 26 can be a conventional unit for reading magnetically encoded disks or tapes. Regardless of the type of on-board data loader 26 employed, the data supplied to checklist system data 18 is formatted as replacement files. Preferably, the files are established with a PC-type computer or similar device, with the computer being used as a database management tool that employs a graphical user interface. Included in the graphical interface are screens for entry of both checklist and checklist item attributes and textual material.

In the practice of the invention, the alert messages supplied by crew alert system 12 and the checklists provided by electronic checklist system 10 are displayed by means of one or more display units such as the multi-function display units currently employed in various types of commercial airplanes. As is indicated in FIG. 1, the currently preferred embodiments of the invention include two display units identified as crew alert system display unit 30 and multi-function display unit 28. In this arrangement, both crew alert system display unit 30 and multi-function display unit 28 are configured and arranged in a manner that is similar to the color monitors that are used in conventional computer and work station systems. Small display units of this type are known in the art and, for example, are employed in the Engine Indication and Crew Alert System that is installed in Boeing Model B757, B767, and B747-400 airplanes. As previously mentioned, the invention currently is preferably embodied with the electronic checklist system 10 and crew alert system 12 being realized in the same digital signal processor (airplane information management system 14). The crew alert system of these embodiments includes the same signal processing and display provisions as the referenced Engine Indication and Crew Alert System. Alternatively, the electronic checklist system of this invention can operate in conjunction with various other types of crew alert systems, either being realized within a common digital signal processor (e.g., airplane information management system 14 of FIG. 1) or being separately realized in different digital data processors.

As is also shown in FIG. 1, the invention includes a checklist interface unit 32, which allows the flight crew to request and execute both normal and non-normal checklists in addition to displaying the checklists that are automatically generated upon detection of an aircraft fault. In the currently preferred embodiments of the invention, checklist interface unit 32 includes a pointing device such as a ball, joystick, or up/down-left/right control keys (not shown in FIG. 1). The pointing device serves as a cursor control for a cursor or other indicia that is generated by electronic checklist system 10. In the currently preferred embodiments, the cursor can be moved over the face of multi-function display unit 28, which is used for displaying normal and non-normal checklists as well as checklist selection menus and other checklist information. As shall be described, the checklist displays provided by the invention preferably include checklist action items and notes, various command buttons, and page control buttons that are activated by moving the cursor to the vicinity of the item to be activated and depressing a switch or similar device that is included in checklist interface unit 32.

Figure 2:
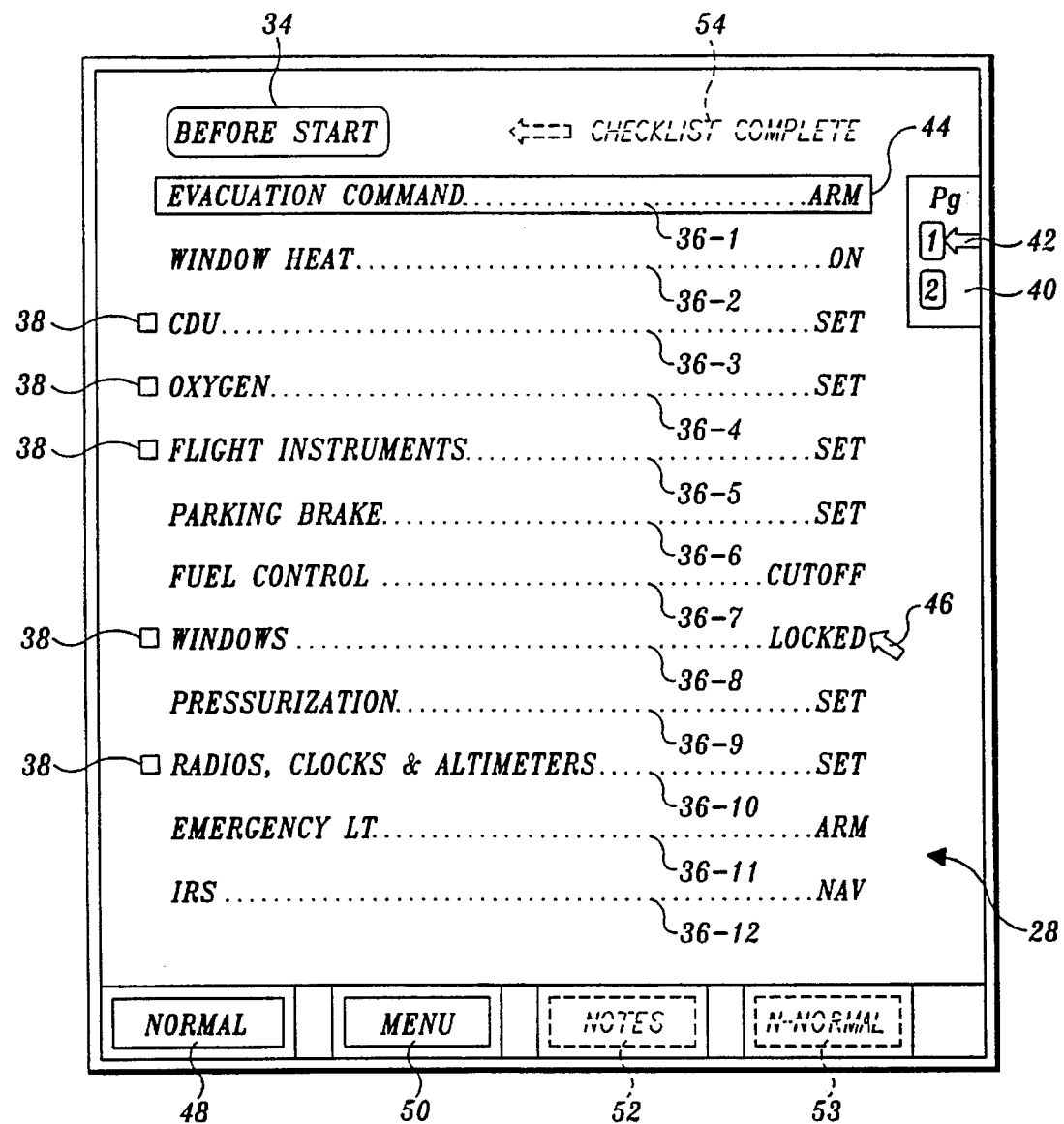
FIG. 2 depicts an exemplary normal checklist (i.e., a checklist of the type generated and displayed by the invention during normal operation of the airplane)

Various other features and advantages of the invention can be understood by considering an exemplary normal checklist (FIG. 2).

Shown in FIG. 2 is an exemplary "Before Start" checklist which is generated by electronic checklist system 10 in FIG. 1 and displayed on the screen of multi-function display unit 28 for execution by the pilot or other member of the flight crew when preparing to start the aircraft engines. As can be seen in FIG. 2, the checklist display includes a checklist title block 34, which in this case displays the title or legend "Before Start." Displayed below title block 34 is a series of action items 36-1, 36-2, 36-3 . . . , 36-12. Listed on the left-hand side of each action item is an airplane system, instrument or other item of equipment. For example, action item 36-11 includes the includes "EMERGENCY LT," which refers to the airplane emergency lighting system, and action item 36-12 includes "IRS," which refers to the airplane inertial reference system. At the right-hand margin of each line item is the condition or status that must be achieved to complete the line item. For example, in the depicted checklist, the airplane emergency lighting system is to be armed in order to complete action item 36-11 and the airplane inertial reference system is to be placed in the navigation (NAV) position in order to complete checklist action item 36-12.

As described above, there are two types of checklist action items: open-loop action items, which require the flight crew to manually check off the action item to confirm that the required action has been taken or that the required condition has been achieved and, closed-loop action items in which the electronic checklist system 10 senses that the required condition has been achieved and automatically confirms completion of the checklist item. In the currently preferred embodiment of the invention, open-loop checklist action items are identified by a small square 38 that is located immediately to the left of the action item (or by other visibly discernible indicia). Closed-loop action items (e.g., action items 36-1 and 36-2) are thus identified by the lack of a symbol (square 38).

Many checklists include more line items than can be simultaneously displayed on a display unit such as multi-function display unit 28 of FIG. 1. In the currently preferred embodiments of the invention, checklists that cannot be provided as a single display are arranged as a series of pages. When such a checklist is displayed, the system display includes a paging indicator (40 in FIG. 2). As can be seen in FIG. 2, paging indicator 40 includes a vertical sequence of numerals that indicate each page of the checklist. Located to the right of the page being displayed is an arrow 42 (a page bar or scroll bar can also be used for page selection).

When a checklist is presented for execution, the crew member who is operating the system utilizes checklist interface unit 32 to control the checklist procedure and, with respect to open-loop checklist action items, to confirm that the required condition or status has been achieved. By way of example, in the Before Start checklist of FIG. 2, execution of the checklist has just begun. In this regard, as is indicated by the rectangle 44 that surrounds checklist item 36-1, line item 36-1 is the first line item of the checklist that has not yet been completed. As will be recognized by those skilled in the art, various techniques such as highlighting or reverse video display can be used in indicating a displayed item such as line item 36-1 (i.e., can be used to fulfill the function of rectangle 44 in FIG. 2).

As previously noted, line items that are not identified by a box 38 are closed-loop checklist items. Thus, completion of line item 36-1 need not be verified by the crew member executing the checklist procedure. That is, a signal that indicates the armed/unarmed status of the Evacuation Command System is supplied to electronic checklist system 10 via data buses 16. This signal is monitored by electronic checklist system 10 whenever the Before Start Checklist is displayed for execution, and the checklist display will be altered to indicate completion of the checklist as soon as the system is armed by a crew member. In this regard, in the currently preferred embodiment of the invention, checklist action items (both open-loop and closed-loop) that have not been completed are displayed in white print. When the checklist line item has been completed, the action item is displayed in green. Moreover, in the currently preferred embodiment, closed-loop line items primarily are completed upon actuation of a switch or other devices that initiate the desired action (e.g., arming of the Evacuation Command System) rather than by monitoring a signal that indicates achievement of desired action.

As noted with respect to closed-loop checklist action item 36-1, signals supplied via data bus 16 are continuously monitored to detect completion of closed-loop checklist action items of all active checklists. Because of this monitoring process, some or all closed-loop line items may be completed without requiting additional confirmation action by a crew member. For example, if the parking brake is set and the airplane window heat system is on when the Before Start Checklist procedure of FIG. 2 is initially displayed for execution, line items 36-2 and 36-6 will already have been completed and, thus, will be displayed in green print.

In the practice of the invention, the crew member executing a checklist need not perform the checklist in accordance with the displayed sequence. In this regard, an incomplete closed-loop action item can be completed at any time by performing the task required for completion (e.g., activating a switch or setting a selector). To complete an open-loop checklist action item, the crew member selects the action item by using the pointing device of checklist interface unit 32 to position a cursor 46 in FIG. 2 so that the cursor is over a designated portion of the checklist line item being completed. When the cursor 46 is positioned to select a line item, the switch associated with the cursor is activated to confirm completion. The electronic checklist 10 notes completion of the line item and causes the line item to be displayed in green.

To provide maximum system flexibility, the cursor 46 also can be used to change the status of a completed line item to "not complete." That is, when cursor 46 is positioned over a portion of a previously completed open-loop action item and the associated switch is activated, electronic checklist system 10 sets the status of the action item back to not complete and causes the display of the line item to revert to white.

Cursor 46 and the pointing device checklist interface unit 32 also can be used to cause a different page of the checklist to be displayed even though the checklist line items of the currently displayed checklist have not all been completed. Specifically, with reference to FIG. 2, if the crew member executing the Before Start Checklist wishes to proceed to page 2 of the checklist prior to completing all checklist action items of page 1, he or she uses checklist interface unit 32 to position cursor 46 over the desired page indicator of paging indicator 40 (e.g., page 2 of the depicted Before Start Checklist). When the switch associated with cursor 46 is activated, page 2 of the Before Start Checklist will be displayed (not shown in the FIGS.).

In the currently preferred embodiments of the invention, it normally is not necessary for the crew member to use cursor 46 to advance the checklist display to the next page after completing all checklist line items of a page. For example, with respect to the Before Start Checklist of FIG. 2, the final open-loop checklist line item requires confirmation that the airplane radios, clocks and altimeters are set (checklist action item 36-10). If all preceding checklist action items (action items 36-1 through 36-9) are complete when cursor 46 is used to confirm completion of line item 36-10 and, in addition, closed-loop action items 36-11 and 36-12 are complete, electronic checklist system 10 will cause page 2 of the Before Start Checklist to be displayed on multi-function display unit 28 of FIG. 1 without requiring any action on the part of the crew member executing the checklist. However, this automatic page transfer feature of the preferred embodiments is inhibited by electronic checklist system 10 when the final item of a page is an Operational Note (which is presented for reading by a crew member) or is a conditional line item that is completed only if a specified condition exists.

Displayed along the lower boundary of the checklist shown in FIG. 2 are multiple switch or button regions (which are referred to herein as "command buttons"). More specifically, the depicted checklist includes a NORMAL button 48, a MENU button 50, a NOTES button 52 and a N-NORMAL (i.e., "NON-NORMAL) button 53. Each of these command buttons is selected and activated by cursor 46 in the previously described manner. That is, to activate a particular command button, cursor 46 is positioned over the selected button and the switch associated with the pointing device of checklist interface unit 32 is activated. As shall be described in more detail, the primary function of NORMAL button 48 is to cause electronic checklist system 10 to display the first unaccessed, incomplete normal checklist in the sequence of checklists that is provided by the electronic checklist system. That is, in the currently preferred embodiment of the invention, the normal checklists are arranged in a sequence that corresponds to the sequence in which they are performed under normal conditions, starting with the Before Start Checklist and ending with the Shutdown Checklist. Arranging electronic checklist system 10 so that the system displays the first incomplete normal checklist when the normal button 48 is activated enhances both ease of operation and system reliability. For example, if execution of a normal checklist has been interrupted in order to execute a non-normal checklist (or for any other reason), a return to the interrupted, incomplete normal checklist requires only that NORMAL button 48 be activated. To further enhance performance and ease of use, the currently preferred embodiment of the invention provide the crew with a reminder that a normal checklist procedure has not been completed. In particular, whenever an incomplete checklist exists, the NORMAL button 48 is displayed with amber text. When there is no incomplete normal checklist, the text of the NORMAL button 48 is white. This same color convention is used relative to display of the checklist title on the hereinafter described system menu screen.

MENU button 50 can be used at any time to select the checklist menu. As shall be described relative to FIG. 4A, the menu display for the currently preferred embodiment of the invention provides access to each checklist provided by the system (both normal and non-normal). In addition, the system menu allows the crew member operating the system to selectively reset all normal checklists or, alternatively, those normal checklists that would be reexecuted during a go-around procedure.

NOTES button 52 is shown in dotted lines in FIG. 2 to indicate that it is not displayed at all times. In particular, activation of NOTES button 52 with cursor 46 causes electronic checklist system 10 to display all operational notes that have been included in the checklists that have been executed during that particular flight. Thus, until a checklist is accessed that includes one or more operational notes, there are no operational notes for display. Whenever notes are not available, NOTES button 52 is not displayed. As soon as operational notes are encountered, electronic checklist system 10 establishes an operational notes file and causes NOTES button 52 to be displayed on all system checklist screens and on the system menu screen.

N-NORMAL button 53 also is shown in dotted lines in FIG. 2 to indicate that it only is displayed when crew alert messages are being supplied by crew alert system 12. The purpose of N-NORMAL button 53 is to provide rapid access and display of non-normal checklists that are associated with crew alert messages. Whenever crew alert system 12 is supplying one or more crew alert messages, the crew member operating electronic checklist system 10 can activate N-NORMAL button 53 to select the generated checklist.

Shown in the upper fight-hand region of FIG. 2 is a legend "CHECKLIST COMPLETE" button 54. However, as will be appreciated, the legend can be located anywhere on the screen. As is indicated by the dotted lines, the legend is not displayed until all checklist line items of the displayed checklist are complete. In accordance with the color convention used in the currently preferred embodiments of the invention, when the checklist action items of both pages 1 and 2 of the Before Start Checklist all have been completed, the legend "CHECKLIST COMPLETE" will be displayed in green on both pages of the checklist.

The previous description has described how an electronic checklist is used by a pilot during a normal procedure, namely making certain that all procedural steps have taken place before the engines of the aircraft are started. In contrast, the present invention is directed to creating an electronic checklist when aircraft faults are detected. While the manner of generating the checklist for the pilot is different, the use of the checklist is substantially the same. When the checklist line items of the display are accomplished, either manually or automatically, the line items change from an incompleted state (i.e., white) to a completed state (i.e., green). The items are highlighted in order of desired completion.

Figure 3:
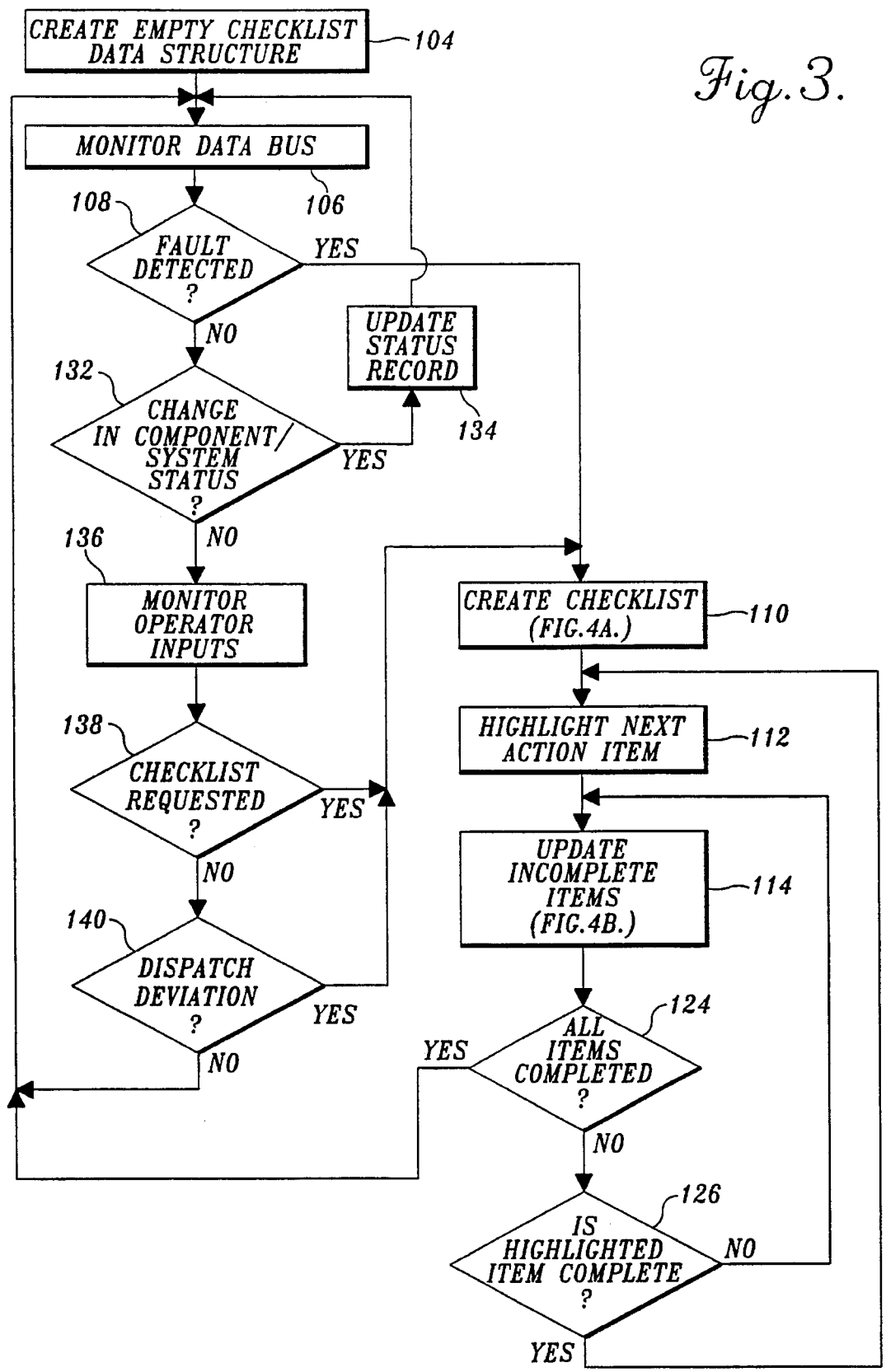
FIG. 3 is a flow chart showing the steps performed by the present invention to generate and display a combined, integrated electronic checklist.

FIG. 3 is a flow chart of the steps performed by the present invention to display a checklist generated when a fault is detected on the aircraft data bus by the checklist system or the crew requests that a checklist be displayed. Before monitoring the data bus, the system initializes an empty checklist data structure that will be used to store the action items of a checklist that correspond to a fault detected at step 104. The initialization is completed before monitoring the data bus in order to minimize the computing time occurring between the time when the fault is detected and the time when the checklist is displayed. After the system is initialized, the checklist system monitors the data bus at a step 106 and determines whether a fault has been detected at step 108. If no fault has been detected, the system determines if there has been a change in the status of a component/system on the aircraft that affects an action item, explanation or note in a checklist at step 132. As indicated above, the checklist system continually reads all the messages transmitted on the aircraft data bus. The system reads a received message and compares the component/system status to its previous status which has been stored in a status record. If the component/system has changed state, becomes inoperative, etc., since the last time its status was reported on the data bus, the status record is updated at step 134.

If the status of the components and various systems of the aircraft have not changed, the system monitors the operator inputs at step 136 and then determines whether the pilot or crew has requested that a checklist be displayed at step 138. If the pilot wishes to see a checklist, it is displayed according to the steps described below.

If the pilot has not requested a checklist to be displayed, the system then determines if the pilot has entered information indicating there is a dispatch deviation at step 140. A dispatch deviation refers to the fact that some component/system of the aircraft is either missing or malfunctioning. Some dispatch deviations are critical, meaning that the aircraft should not be flown with the missing or inoperative equipment. However, for other dispatch deviations, it is possible to safely fly the aircraft provided some extra precautions are taken, such as limiting the aircraft's airspeed or altitude, turning on redundant systems, creating or modifying one or more checklists, etc. As can be seen in FIG. 3, a dispatch deviation is handled in the same manner as a fault. Through the "deferred item" capability as will be described below, a dispatch deviation can also modify other checklists.

Figure 4A:
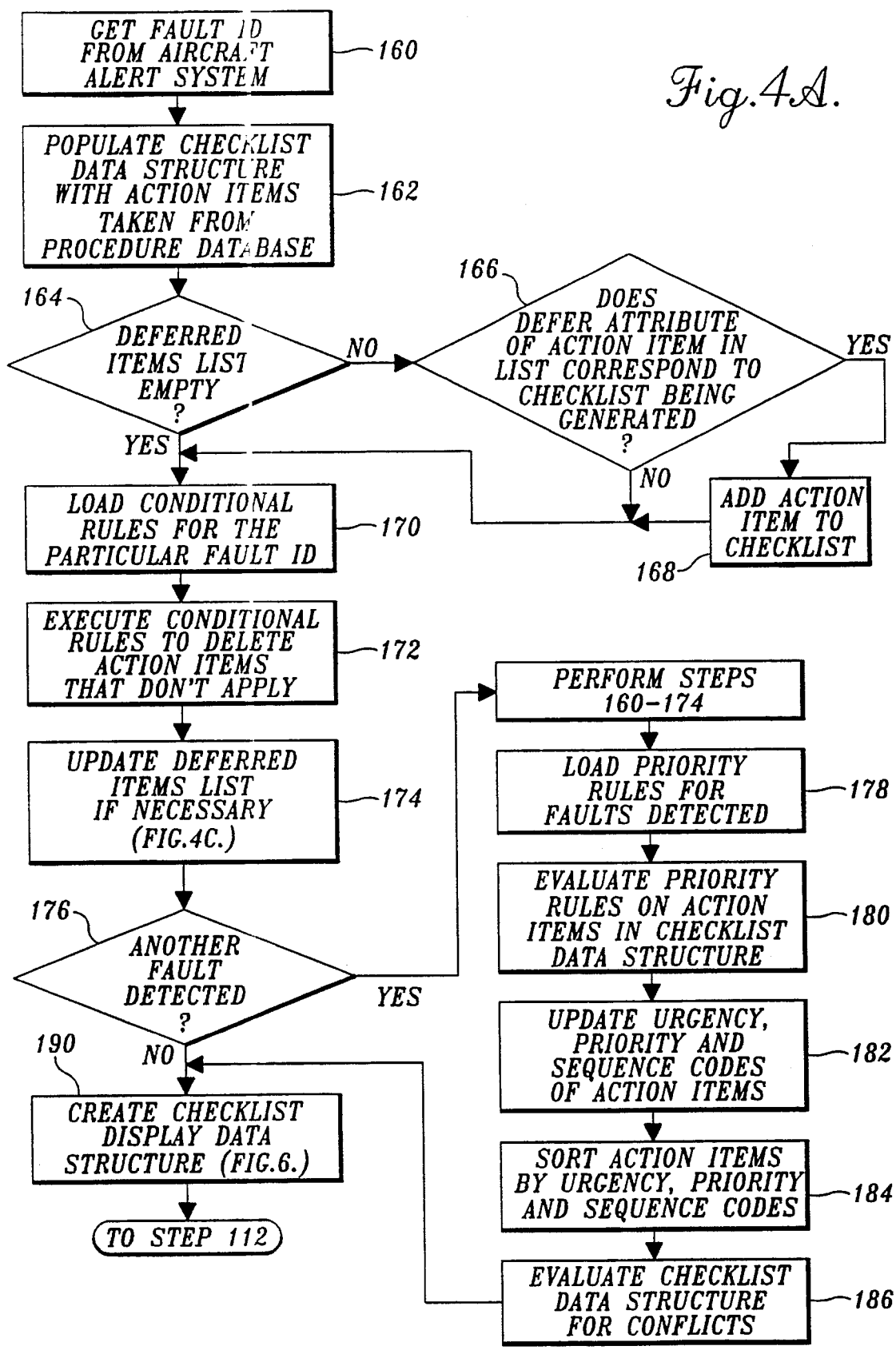
FIG. 4A is a flow chart showing the steps performed by the present invention to create an electronic checklist when two or more faults are detected.
Figure 4B:
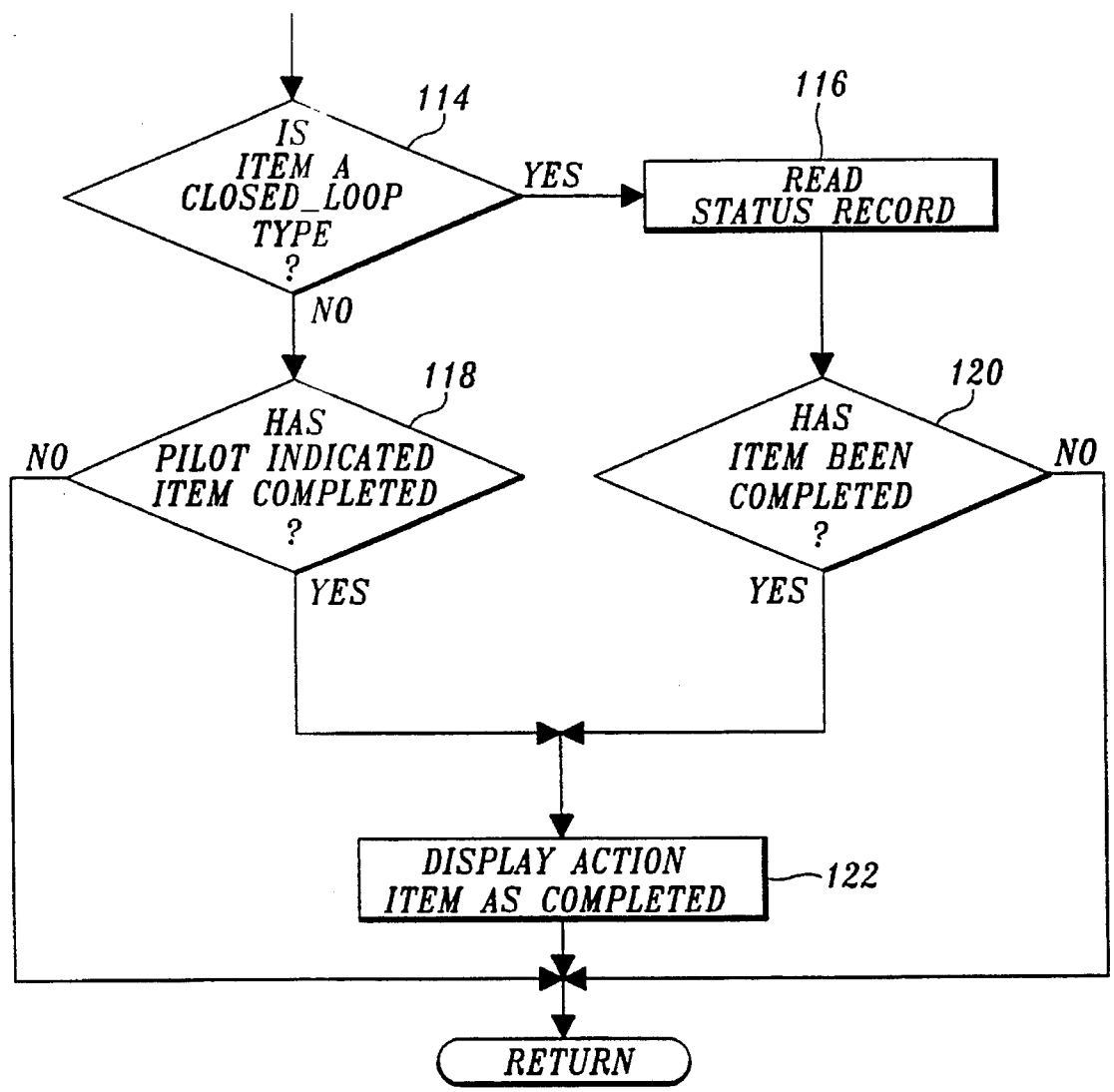
FIG. 4B is a flow chart showing the steps performed by the present invention to update an incomplete action item.

Once a fault has been detected at step 108, the system automatically creates an electronic checklist at step 110 according to the steps shown in FIG. 4A. Once the electronic checklist is created, the first action item to be completed by the pilot is highlighted and displayed to the pilot at step 112. Next, the system determines if each uncompleted action item on the checklist has been performed according to the steps in FIG. 4B. Beginning at step 114, the system determines if the action is a closed loop type. As described above, closed loop action items are those items whose completion can be automatically sensed by the aircraft, such as turning switches, moving levers, etc. If the action is a closed loop item, the system reads the status record at a step 116 to determine if the switch, lever, etc., has been moved to the proper setting by the pilot. Because the status record is continually updated by reading the data bus, the status record can be monitored to determine when an action item has been performed. Once the action item is completed, the action item is displayed in green to show it has been completed at step 122. If for some reason the sensor that detects the position of the switch or status of the system is inoperative, the pilot can proceed to the next action item using an override button on the checklist interface unit (not shown in FIG. 2).

If the action item in the checklist is not a closed-loop type, the pilot must indicate he or she has completed the action item by using the checklist interface unit 32 described above. The system therefore monitors the checklist interface unit to determine whether an the action item is marked by the pilot as having been completed. Once the pilot has completed the action item, the system displays the action item in green to show it is completed at step 122. Returning to FIG. 3, at a step 124, a test is made to determine if all items in the checklist have been completed. If not, the system loops back to step 112 and highlights the next action item to be completed by the pilot. Once all items on the checklist have been completed, the checklist system is finished and displays the "Checklist Completed" message 54 as shown in FIG. 2.

FIG. 4A is a more detailed flow chart showing the steps performed by the present invention to create an electronic checklist when one or more faults are detected on the data bus or when a pilot enters a dispatch deviation. As soon as the electronic aircraft alert system detects a fault, the system reads a fault identification number (ID) that is transmitted on the aircraft data bus at step 160. Each fault on the aircraft has assigned to it a specific ID that is used by the checklist system to identify the action items that are to be performed by the pilot in reacting to the fault. Once the fault ID is obtained, the system populates the empty checklist data structure with action items that correspond to the fault ID. In the present embodiment of the invention, the checklist system uses a procedure database that lists every action item that can be taken by the pilot in response to every detectable fault. A portion of an example procedure database is shown in FIG. 7 and described next.

The procedure database used by the currently preferred embodiment of the invention has a single entry (row) for each action item that can appear in an electronic checklist. The procedure database also has numerous attributes (columns) for each action item. The database stores a name for each action item. For example, ENG2-OIL-F02 refers to an action item in an engine 2 oil fault checklist, while ENG2-OIL-F03 refers to another action item in the engine 2 oil fault checklist.

In addition, each action item has three priority numbers stored in the database. An urgency value (UG) defines the urgency of one checklist in the system with respect to another checklist. For example, the engine fire action items in the procedure database have an urgency value of 50 while the cabin altitude action items have an urgency value of 10. Therefore, between an engine fire checklist and a cabin altitude checklist, the checklist system determines that the cabin altitude checklist has a higher priority and should be displayed first.

The second priority code stored in the database (PRI) defines the priority of the action items having the same urgency value. Finally, the last priority number maintained in the procedure database is the sequence number (SQ) that is used by the checklist system to indicate the relative sequence of an action item between two action items having the same urgency and priority number. Therefore, using the values stored in the UG, PRI, and SQ columns, the checklist system can determine the order in which the action items in the checklist are to be displayed. The way in which the action items are prioritized for a given checklist is more fully described below.

In addition, the procedure database stores the location of the text that comprises the action item or note in a corresponding text file as well as a number of lines occupied by the text for the action item or note. For example, the fourth action item in the engine oil checklist (ENG2-OIL-F04) begins on line 40 and occupies one line of the corresponding text file. Therefore, by using the text value and the line number, the checklist system is able to determine where to retrieve the corresponding text that is displayed on the display unit for the pilot.

Also included in the procedure database are two columns that contain the location and number of lines occupied by an explanation of an action item. The explanation value (EXPL) indicates the location of the corresponding explanation in the explanation text file as well as the number of lines occupied by the explanation. When the pilot wishes to see an explanation of an action item, he selects the explanation button (not shown in FIG. 2) on the display unit. The checklist display system reads the explanation and line number values to retrieve the proper explanation from the explanation text file and displays the retrieved text in a window that overlays the checklist. By selecting the explanation button a second time, the pilot indicates that he or she is finished with the explanation and the system restores the checklist.

The procedure database further stores a control number (CON) that indicates how the component or system to which the action item refers is reported on the data bus. The control number is also stored in the status record described above. Therefore, the checklist display system can determine the state of a component or system by looking for the control number on the data bus or in the status record. In addition, the procedure database stores a state value (STATE) that indicates how the completed value will be reported on the data bus when the pilot has performed the appropriate action. For example, the first action item in the engine fire checklist described above is to close the thrust lever. As can be seen from FIG. 7, the first action item in the engine fire checklist (ENGINE-FIRE-01) has a control number of 1413 and a state value of 37. Therefore, the checklist system reads that the first action item on the engine fire checklist refers to a component that is indicated by item number 1413 on the data bus. The checklist system can read the status record to determine when the value of item 1413 equals 37 and thus determine when the pilot has performed the action item (i.e., closed the thrust lever).

The procedure database also stores a subordinate (SUB) value and a supersedes (SP) value which are used to eliminate conflicting action items in a checklist as will be described below.

An item type column (TP) refers to whether the item is a title (TP=6), a closed-loop action item (TP=2), an open-loop action item (TP=3), a trailing note (TP=7), a leading note (TP=8), or a temporal item (TP=0) which cannot be evaluated until the checklist is executed as will be described below.

Finally, the procedure database includes a "defer to" column (DEFER) that indicates whether the action item should be included in another checklist that may be executed at a later time. For example, if an action item associated with a loss of hydraulic pressure checklist affects the landing gear, then the defer to column for that action item indicates to the checklist system that the action item should be repeated in the landing checklist to compensate for a loss of hydraulic pressure. The details of how the checklist system uses the DEFER column are described below.

Returning to FIG. 4A, the data structure is populated at step 162 using a set of rules or tables that relate a fault D to a plurality of action items stored in the procedure database. Therefore, by reading the table or executing the rule, the checklist system can determine which action items are to be copied from the procedure database and placed in the checklist data structure. The design of such a rule or table is considered to be well within the skill of an ordinary computer programmer and therefore need not be discussed in further detail.

Once the data structure has been populated with the appropriate action items at step 162, the checklist system then determines if the deferred items list is empty at a step 164. If the deferred items list is not empty, the checklist system scans the DEFER column of the action items to see if they match the checklist being generated at step 166. If the defer column does match the checklist being generated, the deferred action item is added to the checklist at a step 168. For example, if the pilot indicates via a dispatch deviation that a hydraulic pump indicator light has burned out, then the checklist system may instruct the pilot to move a hydraulic switch to its demand position. This action item is to be completed by the pilot when he or she executes the "before start" checklist before the aircraft engines are started. As will be described further below, the checklist system enters the action item concerning the hydraulic switch into the deferred items list and places a code, "Before_St", in the DEFER attribute column for the action item. When the checklist system creates the "before start" checklist, it reads the DEFER column to detect that there is an action item in the deferred items list that is associated with the "before start" checklist being created. Therefore, the action item is moved from the deferred items list to the list of action items that comprise the "before start" checklist.

After the checklist system has determined all the action items that are to be placed in the checklist, the system then loads a series of conditional rules that apply to the particular fault ID at step 170. Conditional rules determine whether an if/then statement in a action item is true or false. For example, using the engine fire checklist described above, one of the action items says if the APU (auxiliary power unit) is available, it should be started. The conditional rule corresponding to such a statement instructs the checklist system to read the status record to determine if the APU is available. If the checklist system determines that the APU is not available, then there is no need to have such an action item in the engine fire checklist. Therefore, the system automatically deletes this action item from the list of action items contained in the checklist data structure at step 172.

Another example of a conditional rule that is not as explicit is shown in the cabin depressurization checklist described above. The second action item instructs the pilot to supply oxygen to the crew and passengers if the cabin altitude cannot be controlled. However, if the aircraft altitude is less than 10,000 feet, then there is no need to supply the crew and passengers with oxygen. Therefore, the conditional rule for the second action item would instruct the checklist system to read the status record for the value reported by the aircrafts altimeter. If the altimeter is reading that the aircraft is below 10,000 feet, the checklist system can delete the second action item from the checklist data structure.

As will be appreciated, a set of conditional rules is developed by reading the text of each action item and by asking pilots and aircraft engineers to interpret the meaning or need for the action item under a variety of circumstances. A software rule can then be coded to mimic how an experienced pilot or engineer would react to the action item under any given circumstance.

Not all action items can be evaluated using conditional rules before the checklist is shown to the pilot. Some action items, called "temporal items," can only be evaluated as the checklist is being completed in real time by the pilot. For example, in the engine fire checklist described above, the pilot is asked if the engine fire warning light is still on. If so, the pilot is to rotate the engine fire switch and hold for one second. This is an example of a temporal item because as the checklist is being created, the program cannot evaluate whether the fire warning light is still on. The type column (TP) in the procedure database is used to indicate if an action item is temporal. If so, the action item is not evaluated by a conditional rule.

Figure 4C:
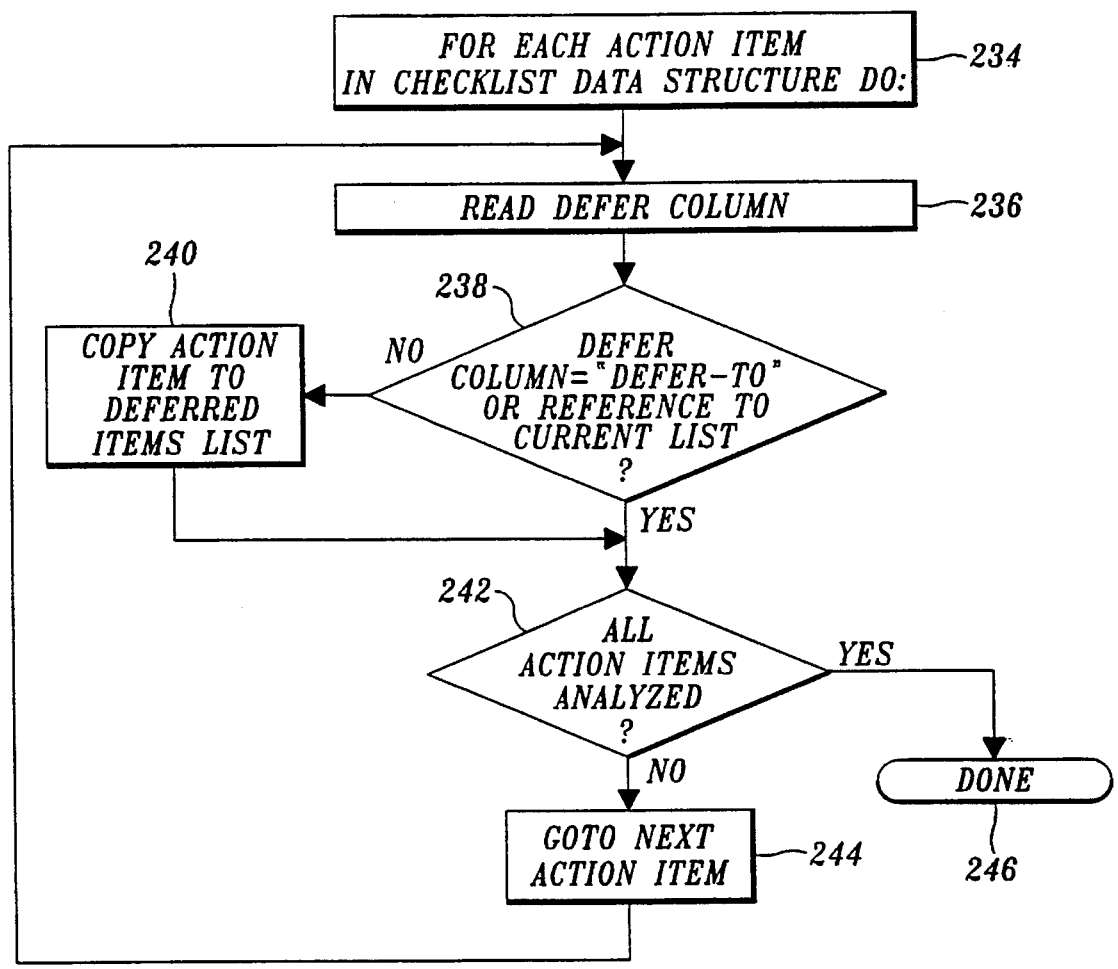
FIG. 4C is a flow chart showing the steps taken by the present invention to modify a checklist as a result of an earlier detected fault.

Next, the checklist system scans each action item in the checklist to determine if the list of deferred action items needs to be updated according to the steps shown in FIG. 4C. As indicated above, the occurrence of one fault during the operation of the aircraft may affect later checklists. For example, if the aircraft experiences an engine fire, the pilot may have to perform extra steps during landing. Therefore, the checklist system operates to modify those checklists that are affected by an earlier fault.

The DEFER attribute of the procedure database is used to indicate which action items affect later checklists. The default value for the DEFER column is "Defer_To" to indicate no other checklist is affected. However, if the DEFER column has a value other than "Defer_To," the checklist copies the action item to the named checklist. Additionally, if the value in the DEFER column refers to the current list created, then the checklist system recognizes that the action item was placed in the list due to an earlier detected fault. Therefore the action is not copied back to the deferred items list.

Beginning at a step 234, the checklist system begins analyzing each action item in the checklist data structure. At a step 236, the DEFER column of an action item is read. A test is performed at a step 236 to determine if the value of the defer column is equal to "Defer_To" or the name of the current list. If so, the checklist system determines if all the action items in the list have been analyzed and if not proceeds to the next action item at a step 244.

If the value in the defer column is something other than "Defer_To" or the current list, the checklist system copies the action item to the deferred items list described above. For example, in the checklist data structure shown in FIG. 9, the action items CAB-ALT-RD-07 and ENGINE-FIRE-6B both affect the landing preparation checklist as indicated by the "Land_Prp" value in the DEFER column. Upon analyzing these action items, the checklist system will place a copy of the action items into the deferred items list. When the landing preparation checklist is constructed, the checklist system will add these deferred action items.

Once all of the checklist items have been evaluated using the applicable conditional rules in order to remove any action items that do not apply to the aircraft present condition, the system determines if another fault has been detected. It should be noted that in the preferred embodiment of the present invention, the checklist system is interrupted each time a fault is detected on the data bus. However, for purposes of illustration, a separate test 176 is shown in FIG. 4A. If another fault has not been detected, the system takes the checklist data structure and creates a second checklist display data structure as will be described below. The checklist display data structure is used by the checklist system and displayed on the aircraft's display unit according to the methods described in the '309 application referenced more fully above.

If at any time while the checklist is being processed another fault is detected, the checklist system must again obtain the new fault ID, and populate the data structure with the corresponding additional action items, including action items contained in the deferred items list. The system then loads and evaluates the conditional rules for the newly detected fault. The new action items are appended onto the end of the list of action items created by the checklist system for the first fault.

FIG. 8 is an example of a checklist data structure that is populated by action items associated with the engine fire checklist and the cabin depressurization checklist described above. If the engine fire fault is detected first, the engine fire action items are the first items in the checklist followed by the cabin altitude action items.

As described above, the order of the items in the checklist as they are to be shown to the pilot is dependent upon the current operating characteristics of the aircraft. Such operating characteristics may include the altitude of the aircraft, the temperature of the air outside the aircraft, the fuel remaining, the speed of the aircraft, etc. As previously indicated, if the aircraft is in the cruise phase of flight, i.e., above 10,000 feet, then the loss of pressure to the aircraft poses a much more serious risk to the people on board the aircraft than does the engine fire. Therefore, the action items corresponding to the loss of cabin pressure must be performed by the pilot prior to the steps to be performed in fighting the engine fire.

In order to arrange the action items in the checklist, the checklist system uses the urgency code, the priority code, and the sequence code stored in the procedure database described above. The flight urgency code indicates the priority of one checklist to another. For example, using the procedure database shown in FIG. 7, the urgency of an engine oil fault (indicated by the label ENG2-OIL-F0) is assigned a numeric value of 27. On the other hand, the cabin depressurization fault (indicated by CAB-ALT-RD) has a urgency value that is assigned to 10. Therefore, between the two faults, a cabin depressurization is deemed to be more urgent (as indicated by the lower urgency code) and thus the action items for the cabin depressurization checklist should be performed first. However, as will be discussed below, the priority numbers may be changed by the checklist system, depending on the current operating characteristics of the aircraft. The initial values for most of the priority numbers are assigned assuming the fault would occur in the cruise phase of flight because most of the aircraft flying time is spent at cruise. Procedures that are used only in one phase of flight, such as landing, are assigned priority numbers assuming the checklist would be viewed during the related phase of flight.

The second priority code is labeled priority (PRI) in the procedure database and defines the order of the action items in the checklists having identical urgency values. The priority codes are assigned as follows:

| | | |
|---|---|---|
| A. | Maintain Aircraft Control | Critical steps required to maintain aircraft control |
| B. | Pilot Life | Helps keep pilots alive to continue flying |
| C. | Passenger Life | Steps to keep passengers alive |
| D. | Critical Systems | Steps to prevent degradation of critical airplane systems |
| E. | Operability | Steps to make the airplane more flyable, to extend its operation and its chances to reach a runway |
| F. | Weather | Steps that enable the pilot to manage adverse weather situations (Category may be higher or lower than configuration items below, dependent upon sensed current weather.) |
| G. | Aerodynamic Configuration | Steps that configure switches as necessary for landing |
| H. | System Configuration | Steps that reposition system switches to correspond with actual or necessary configuration |
| I. | Information | Information for landing, loss of protection information, general caution information, and crew awareness |

Each priority code in the procedure database shown in FIG. 7 contains an abbreviation of these letter codes and thus can be sorted alphabetically. As can be seen in the procedure database, titles and blank lines have a high priority code, "AAA" and "AAB," respectively, since the checklist system always places these as the first items in a checklist.

The third priority code for each action item is a sequence number (SQ) which indicates where an action item is to be placed among two action items having the same urgency and priority codes. Thus, to arrange a list of action items into the proper sequence, the list must be first sorted by urgency codes, then by priority codes, and finally by sequence codes.

As previously indicated, the urgency of a particular action item may be dependent upon the phase of flight and condition of the aircraft. Therefore, referring again to FIG. 4A, the checklist system loads a set of priority rules for the faults detected at step 178. These rules analyze a particular fault to determine whether the priority numbers for the actions should be changed. For example, if the aircraft detects a rapid cabin depressurization fault, then the priority rules for this fault are loaded and then executed at step 180. The priority rules cause the checklist system to monitor certain aircraft data from the status data structure that may affect the priority of an action item. For example, if the aircraft's altitude is less than 10,000 feet, then the urgency of the cabin decompression may be changed from 10 (as shown in FIG. 7) to 70. As a result, an engine fire having an urgency value of 50 would be determined by the checklist system to be more critical.

The priority rules are developed by interviewing pilots and engineers to determine how they would react in a given situation for a given phase of flight or operating characteristics of an aircraft. Standard "knowledge engineering" techniques are used by the designers of the checklist system to develop the priority rules. The priority rules for any particular aircraft obviously depend upon the type of aircraft being-flown and the types of actions normally taken by the pilots. Once a consensus is determined from the pilots and engineers on how to react to a given fault, the consensus is encoded as a priority rule that is evaluated by the checklist system to determine if the priority of the action items should be changed.

Once the priority rules have been executed, the urgency, priority and sequence codes of the action items are updated, if required, at step 182. Next, the action items are sorted at step 184 such that action items with the lowest urgency code are placed first in the checklist, action items having the same urgency code are then sorted by their priority code and, finally, action items having the same urgency and priority codes are sorted according to their sequence code.

FIG. 9 shows the action items of the checklist data structure shown in FIG. 8 after the items have been sorted according to their urgency, priority, and sequence codes. In this case, the cabin altitude checklist action items have maintained their urgency value of 10, indicating the aircraft must be flying at an altitude whereby the pilot must provide the crew and passengers with oxygen and descend to a lower altitude before attempting to put out the engine fire. Furthermore, as can be seen by the data structure in FIG. 9, the sequence of all the action items are determined according to the priority scheme described above.

Returning to FIG. 4A, once the action items of the checklist have been sorted, the present invention evaluates the checklist action items for conflicts at step 186 before creating the checklist display data structure at step 190 and displaying the checklist to the pilot and crew on the display unit.

Figure 5B:
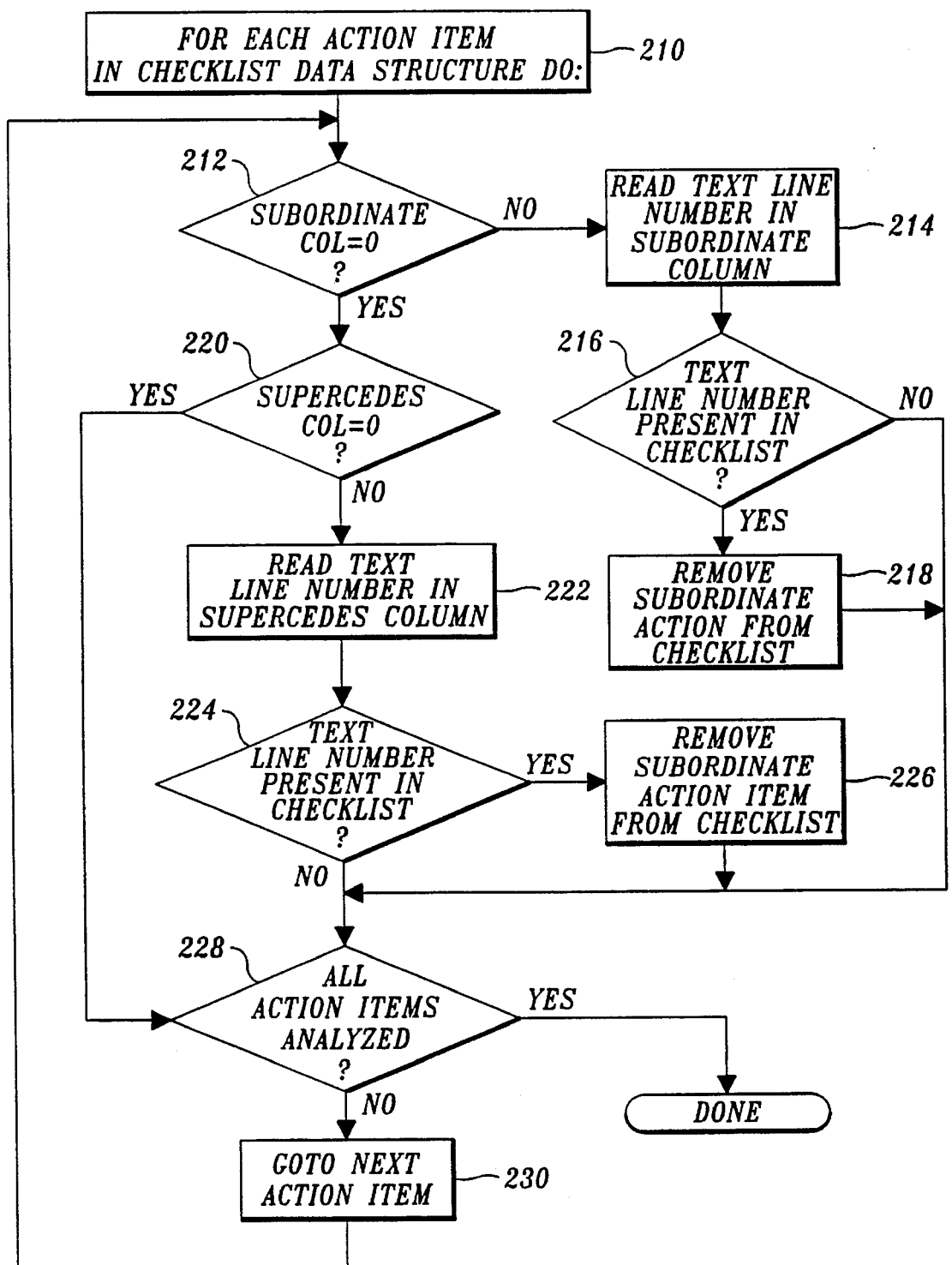

FIGS. 5A and 5B are two flow charts that show the steps of two alternative approaches that are used by the checklist system to remove conflicts from a checklist. Conflicts may involve having two action items that tell the pilot to do the same thing, two action items that tell the pilot to do mutually exclusive things, or action items that are otherwise ambiguous. An example of such a conflict may be one action item that tells the pilot to set the flaps on the aircraft to 30 while another action tells the pilot to set the flaps to 20. If both these action items were included in a checklist, the pilot would have to make a judgment regarding the proper setting of the flaps. Therefore, the present invention uses predefined conflict rules that are designed to eliminate conflicting action items from the checklist. When rules are used to eliminate conflicts, then the steps shown in FIG. 5A are performed.

Beginning at step 200, the conflict rules for a checklist are loaded. These conflict rules are not specific to any given fault but apply to all checklists. The conflict rules are executed in step 202, whereupon action items in the checklist are modified, or removed at step 204. The conflict rules are again developed by interviewing pilots and engineers to determine the most appropriate course of action when given conflicting information. For example, a conflict rule may say that if two flap settings are given, always use the greater. Alternatively, the rule may state that, given two conflicting flap settings, always use the average, etc. Additionally, the conflict rules may depend upon the phase of flight and therefore the rule may direct the checklist system to monitor the data bus or read values from the status record to determine the aircraft's operating characteristics in order to eliminate conflicts. Additionally, the conflict rules cause the checklist system to search the checklist data structure to remove any double entries or any other obvious action items that are redundant.

Another way of encoding the conflict rules is using the values in the subordinate (SUB) and supersedes (SP) columns stored in the procedure database. In the present embodiment of the checklist system, a zero for these values indicates that a particular action item is neither subordinate to, nor supersedes, any other action item. However, if a number other than zero is stored in these columns of the database, the number refers to the item to which the action item is either subordinate or supersedes. As can be seen in FIG. 7, the action item for LBL-DCT-LK-02 has 43 stored in its subordinate column. This indicates the action item is subordinate to the action item contained in line 43 of the text file of the action items. In this case, line 43 corresponds to the action item ENGINE-FIRE-03. Therefore, the checklist system looks at the text lines set to be displayed by the checklist data structure to determine if line 43 is present. If so, then the action item that is subordinate to line 43 (LBL-DCT-LK-02) is removed.

FIG. 5B shows the steps performed by the checklist system to eliminate conflicts according to a subordinate and supersedes scheme. Beginning at step 210, the system evaluates each action item in the checklist data structure. At step 212, a test is made to determine if the value stored in the subordinate column is equal to zero. If not, the system reads the text line number stored in the subordinate column at step 214. The system then determines at step 216 whether the text line is present in the checklist. If so, the subordinate action item is removed at step 218.

If the subordinate column for an action item is equal to zero, the checklist system determines at step 220 whether the value of the supersedes column is equal to zero. If not, the system reads the text line number in the supersedes column at step 222 and, then, determines whether the text line number is present in the action items of the checklist at step 224. If the text line number is present, the subordinate action item, indicated by the text line number, is removed at step 226. If the supersedes value is zero, the system proceeds to step 228 where a test is made to determine if all action items in the checklist have been analyzed. If not, the system proceeds to the next action item at step 230 before returning to step 212 and analyzing the subordinate and supersedes columns. As will be appreciated, the methods of FIGS. 5A and 5B are not mutually exclusive and a combination of these techniques can be used to remove conflicting action items from a checklist.

FIG. 6 shows the steps performed by the present invention to create a new display data structure that is read by the system when displaying the checklist. Beginning at step 250, the system reads each action item in the conditioned, ordered, and conflict-free list of action items and places the name of the action in the display data structure at step 252. At a step 253, the checklist system inserts the priority codes for each action item into the display data structure. The checklist system then puts the address of the text for the action item and number of lines occupied by the text in the display data structure at step 254. The location of the explanation and number of lines occupied by the explanation are inserted into the display data structure at a step 255. The control number and completion criteria are then inserted into the display data structure at a step 256. As indicated above, the completion criteria indicates to the checklist system what value should be stored in the status record to indicate that the action item has been completed. For example, if the action item tells the pilot to turn the throttles off, the completion criteria indicates the numeric value that indicates the throttle position is off. By determining if the value stored in the status record for the throttles equals the completion criteria, the system knows when the pilot has completed the action item. Finally, the type values and the defer values are placed in the display data structure at a step 258.

FIG. 10 shows the resulting display data structure created by the checklist system from the checklist data structure shown in FIG. 9. As will be appreciated, the checklist display system only requires some of the data stored in the checklist data structure in order to display the checklist to the pilot.

As can be seen, the present invention automatically generates an electronic checklist that is customized to the aircraft's current operating characteristics in response to two or more faults detected. If action items in the checklist should not be performed, the checklist system removes them from the checklist so they are not shown to the pilot. The system combines the action items for the multiple detected faults in the proper order and any redundant or conflicting steps are removed. Thus, the present invention frees a pilot from having to simultaneously look at two or more paper checklists when he or she encounters a multiple fault. In addition, the checklist system of the present invention can modify checklists that will be used in a later phase of flight for faults that occur during an earlier phase of flight. The present invention thus saves the pilot time and helps prevent the pilot from making errors when confronted with multiple fault situations.

While the preferred embodiment of the invention has been illustrated and described, it is to be understood that, within the scope of the appended claims various changes can be made therein without departing from the spirit and scope of the invention. For example, the present invention is not limited to aircraft displays, but could be used in any environment where checklists detailing a series of steps to be taken in a given situation are used. It could also be implemented with different graphical means of indicating the status of an item. Alternatives are readily available to the rules and databases described above. The nuclear power industry uses checklists for controlling a nuclear reactor. The present system could easily be adapted to display electronic versions of these checklists and could be programmed to combine multiple checklists in the event more than one fault in the reactor is detected. Another example where the present invention could be used is in outer space where astronauts are given lists that detail the steps of a mission that is to be completed. The system could be run by an onboard computer carried by the astronaut such that if the mission of the astronaut changed, or an emergency situation occurred, a new electronic checklist could be produced that was tailored to the astronaut's immediate situation.

The embodiments of the invention in which an exclusive property or privilege is claimed are defined as follows:

1. A computer-based method of producing a single electronic checklist in response to two or more faults detected by an aircraft sensing system and transmitted on an aircraft data bus, the method being performed by an electronic checklist system of the type that can monitor the aircraft data bus and display one or more action items to be performed by a pilot or crew in response to an aircraft fault, the method comprising the steps of:

monitoring the aircraft data bus for two or more fault codes that are produced by the aircraft sensing system when the aircraft sensing system detects two or more faults;

reading the fault codes from the aircraft data bus when the faults have been detected;

determining a number of action items to be performed by the pilot or crew in response to each fault code read from the data bus;

placing the number of action items into a single list, each action item having associated with it a priority code;

executing one or more priority rules associated with each fault code, which cause the electronic checklist system to evaluate one or more operating characteristics of the aircraft;

sorting the action items in the angle list by the priority codes and the operating characteristics of the aircraft; and displaying the single list of action items to the pilot and crew.

2. The computer-based method of claim 1, further comprising the step of:

executing one or more conflict rules before the step of displaying the action items, the conflict rules causing the electronic checklist system to remove any conflicting action items from the list of action items.

3. The computer-based method of claim 2, wherein each action item has associated with it a code that indicates whether the action item is subordinate to or supersedes another action item, wherein the step of executing the one or more conflict rules further comprises the steps of:

evaluating each action item in the list to determine if the action item is subordinate to or supersedes another action item in the list;

removing the action item if the superseding action item is present in the list; and removing the other subordinate action item if it is present in the list.

4. The computer-based method of claim 1, further comprising the step of:

executing one or more conditional rules before the step of displaying the action items, the conditional rules causing the electronic checklist system to determine if an action item should be performed by the pilot or crew and, if not, deleting the action item from the list of action items.

5. The computer-based method of claim 1, wherein the step of monitoring the aircraft data bus occurs continuously and the steps of reading the fault codes, determining a number of action items, placing the number of action items in a list, executing one or more priority rules, and sorting the action items are done each time a new fault code is read from the aircraft data bus.

6. The computer-based method of claim 1, further comprising the step of:

determining if an action item in the list of action items affects one or more of the action items associated with another electronic checklist and, if so, modifying one or more of the action items associated with the other checklist.

7. The computer-based method of claim 1, further comprising the step of:

determining if a pilot has entered information into the computer regarding a malfunctioning component or system on the aircraft;

determining if the malfunctioning component or system is referenced by an action item in an electronic checklist; and modifying one or more of the action items of the electronic checklist to indicate the proper steps to be taken by the pilot to compensate for the malfunctioning component or system.

8. An electronic checklist system for producing a single electronic checklist in response to two or more system faults detected by a fault sensing system, the checklist including one or more action items to be performed in response to a fault, the system comprising:

means for detecting two or more fault codes that are produced by the fault sensing system when the fault sensing system detects two or more faults;

means for reading the fault codes from the fault sensing system when the faults have been detected;

means for determining a number of action items to be performed in response to each fault code read;

means for placing a number of action items into a single list, wherein each action item has associated with it at least one priority code;

means for executing one or more priority rules that cause the electronic checklist system to evaluate one or more operating characteristics of the system and to modify the priority codes of the action items based on the operating characteristics of the system;

means for sorting the action items in the single list by the priority codes; and means for displaying the single list of action items.

9. The electronic checklist system of claim 8, further comprising:

means for executing one or more conflict rules that cause the electronic checklist system to remove any conflicting action items from the list of action items.

10. The electronic checklist system of claim 9, wherein each action item has associated with it a code that indicates whether the action item is subordinate to or supersedes another action item, wherein the means for executing the one or more conflict rules further comprises:

means for evaluating each action item in the list to determine whether the action item is subordinate to or supersedes another action item in the list;

means for removing the action item if the superseding action item is present in the list; and means for removing the other subordinate action item if it is present in the list.

11. The electronic checklist system of claim 8, further comprising:

means for executing one or more conditional rules that cause the electronic system to determine if an action item can be performed and, if not, means for deleting the action item from the list of action items.

12. The electronic checklist system of claim 8, wherein the means for monitoring the detecting two or more faults operates to monitor the fault sensing system continuously and the means for reading the fault codes, determining a number of action items, placing the number of action items in a list, executing one or more priority rules, and sorting the action items operate each time a new fault is read from the fault sensing system.

* * * * *